(12) United States Patent
Doherty et al.

(10) Patent No.: US 12,709,712 B2
(45) Date of Patent: Aug. 18, 2026

(54) SYSTEMS AND METHODS FOR MICROWAVE-DRIVEN CATALYTIC CONVERSION OF PLASTICS INTO CARBON BLACK MATERIALS AND GASES

(71) Applicant: Carbon Conversion Group, Inc., Murfreesboro, TN (US)

(72) Inventors: Robert Doherty, Murfreesboro, TN (US); Lloyd Spencer, Woodinville, WA (US)

(73) Assignee: Carbon Convergence Group, Inc., Murfreesboro, TN (US)

( * ) Notice: Subject to any disclaimer, the term of this patent is extended or adjusted under 35 U.S.C. 154(b) by 0 days.

(21) Appl. No.: 19/300,552

(22) Filed: Aug. 14, 2025

(65) Prior Publication Data

US 2026/0049246 A1 Feb. 19, 2026

Related U.S. Application Data

(60) Provisional application No. 63/683,183, filed on Aug. 14, 2024, provisional application No. 63/682,939, filed on Aug. 14, 2024.

(51) Int. Cl.
*C10B 19/00* (2006.01)
*C01B 32/16* (2017.01)
(Continued)

(52) U.S. Cl.
CPC .............. *C10B 19/00* (2013.01); *C01B 32/16* (2017.08); *C01B 32/184* (2017.08); *C10B 49/18* (2013.01);
(Continued)

(58) Field of Classification Search
CPC ......... C10B 19/00; C10B 49/18; C10B 53/07; C10B 57/06; C01B 32/184; C01B 32/16;
(Continued)

(56) References Cited

U.S. PATENT DOCUMENTS 12,240,951 B2 3/2025 Xiao
2003/0170906 A1* 9/2003 Swain .................. G01N 27/305 436/171
(Continued)

*Primary Examiner* — Quang T Van
(74) *Attorney, Agent, or Firm* — Key Kesan Dallmann PLLC

(57) ABSTRACT

A system for microwave-assisted catalytic conversion of plastics into carbonaceous materials and gases includes a materials sorter to sort and remove metals from a batch of plastics; a metal detector to detect metals in the batch of plastics; a mixer configured to receive the batch of plastics and a corresponding batch of micro or nano-scale metal oxides, and further configured to produce a mixture of the plastics and the metal oxides to achieve an essentially uniform distribution of the metal oxides in the plastics; and a rotary microwave oven in communication with a microwave generator and configured to receive microwaves to heat contents of the rotary microwave oven. The rotary microwave oven receives the mixture; and a processor executing a program of instructions controls operation of the rotary microwave oven to convert the plastics to produce one or more carbonaceous materials and one or more gases.

17 Claims, 16 Drawing Sheets

(51) Int. Cl.

| | |
|---|---|
| ***C01B 32/184*** | (2017.01) |
| ***C10B 49/18*** | (2006.01) |
| ***C10B 53/07*** | (2006.01) |
| ***C10B 57/06*** | (2006.01) |
| ***C10G 1/02*** | (2006.01) |
| ***H05B 6/64*** | (2006.01) |
| ***H05B 6/80*** | (2006.01) |

(52) U.S. Cl.

CPC .............. *C10B 53/07* (2013.01); *C10B 57/06* (2013.01); *C10G 1/02* (2013.01); *H05B 6/6447* (2013.01); *H05B 6/806* (2013.01); *C01B 2202/36* (2013.01); *C01B 2204/32* (2013.01); *C10G 2300/1003* (2013.01)

(58) Field of Classification Search

CPC ... C01B 2202/36; C01B 2204/32; C10G 1/02; H05B 6/6447; H05B 6/806; C01G 2300/1003

USPC ....... 219/702, 704, 680, 686, 687, 679, 678, 219/716, 749; 436/155, 157, 183, 148, 436/147, 171; 204/157.15, 157.43, 158.2, 204/158.21

See application file for complete search history.

(56) References Cited

U.S. PATENT DOCUMENTS

2005/0045625 A1* 3/2005 Collins, Jr. ............ B01J 19/126 219/679
2022/0010216 A1* 1/2022 Jiang ........................ C10G 1/10

* cited by examiner

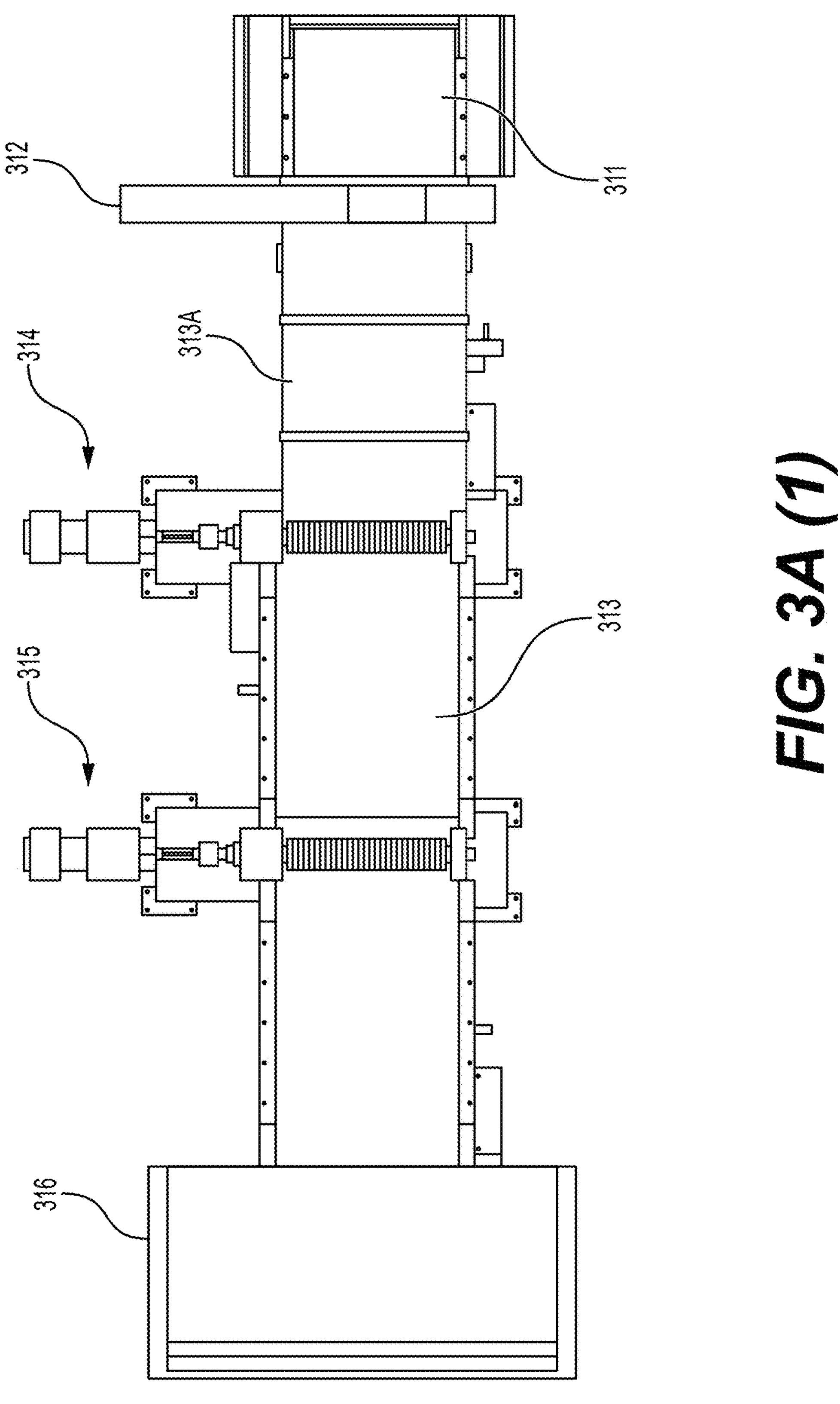
FIG. 3A (1)

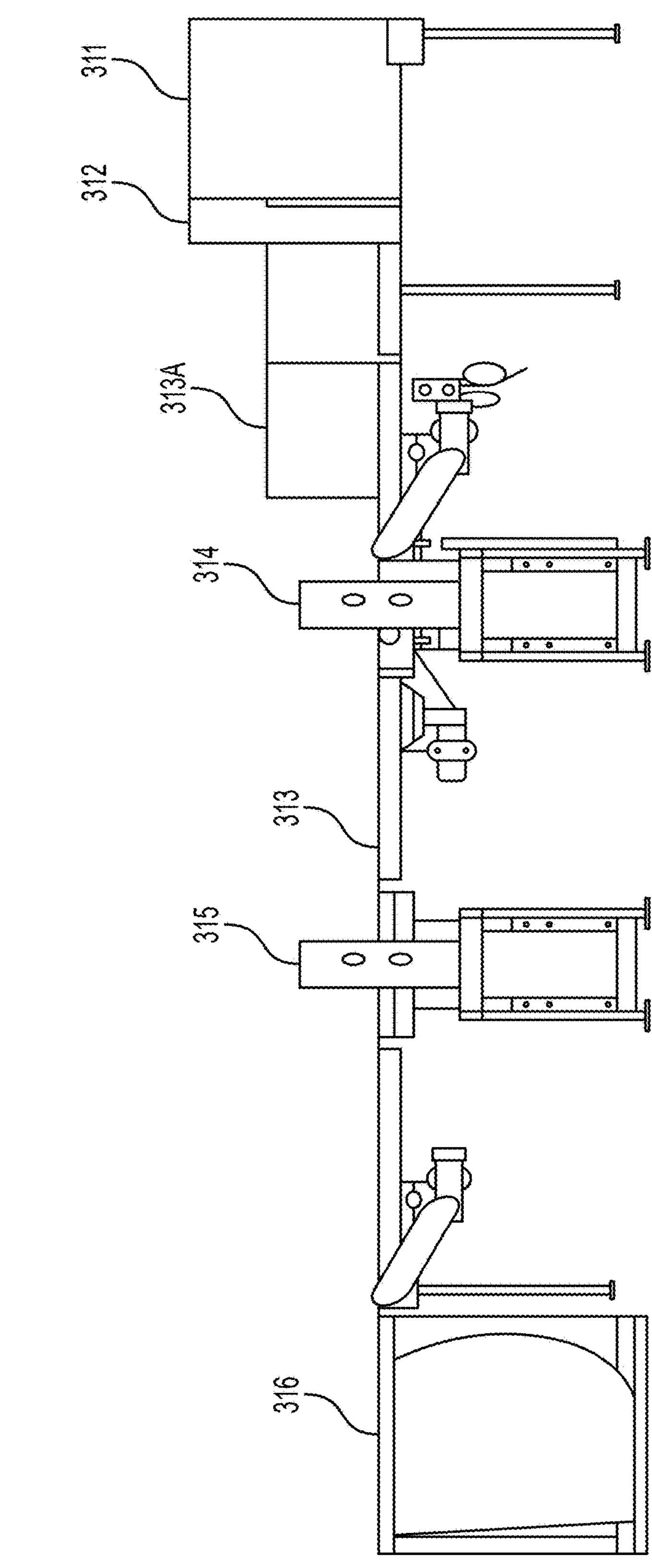
FIG. 3A (2)

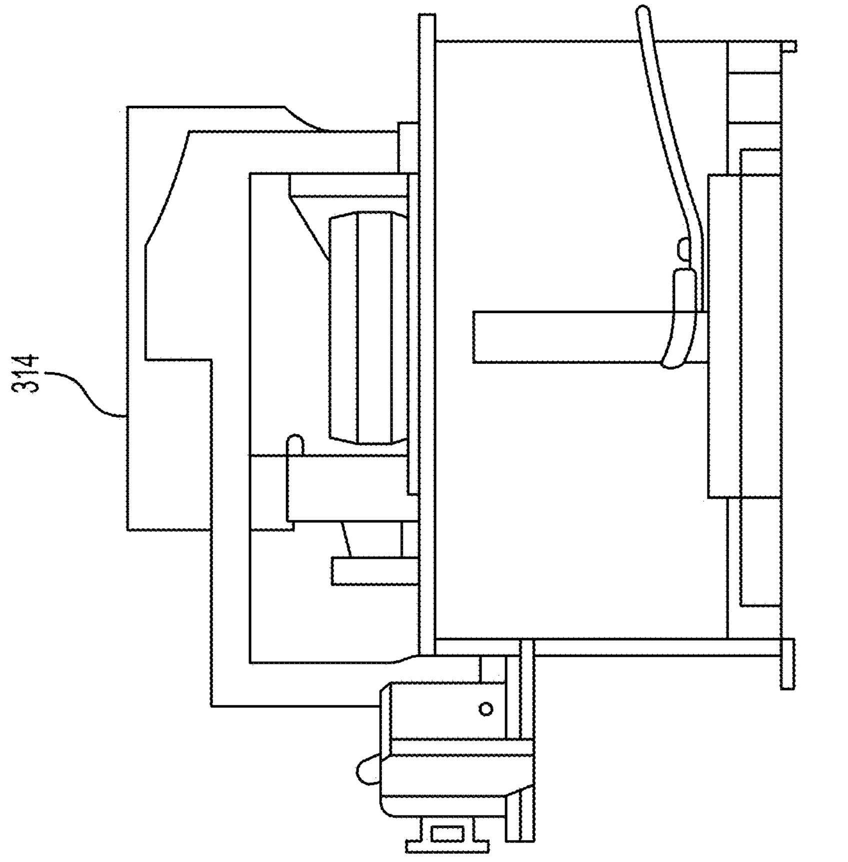
FIG. 3A (3)

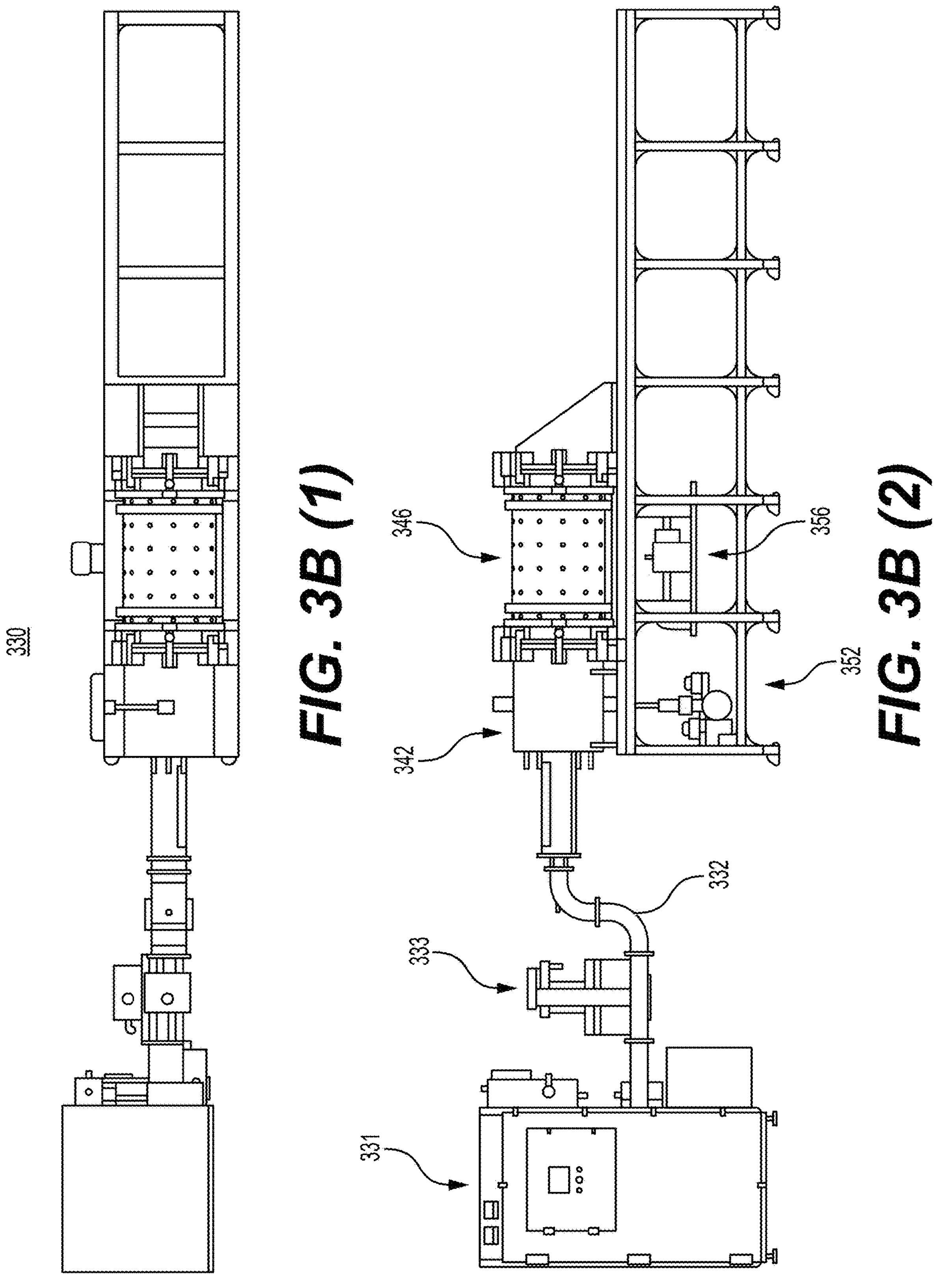
FIG. 3B (1)
FIG. 3B (2)

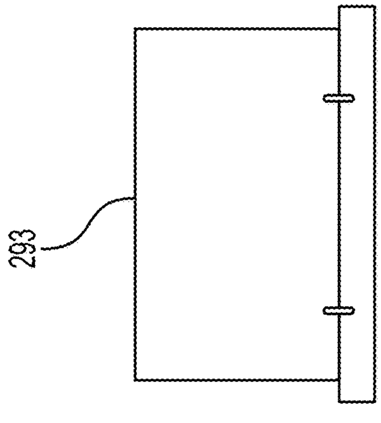
293
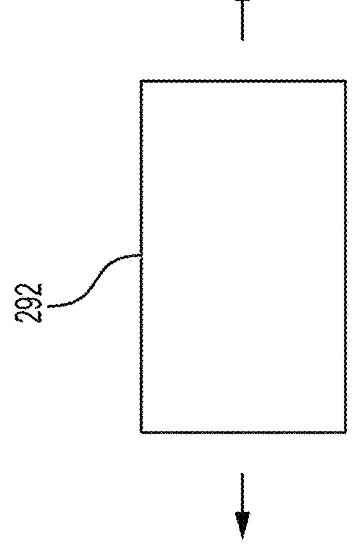
292
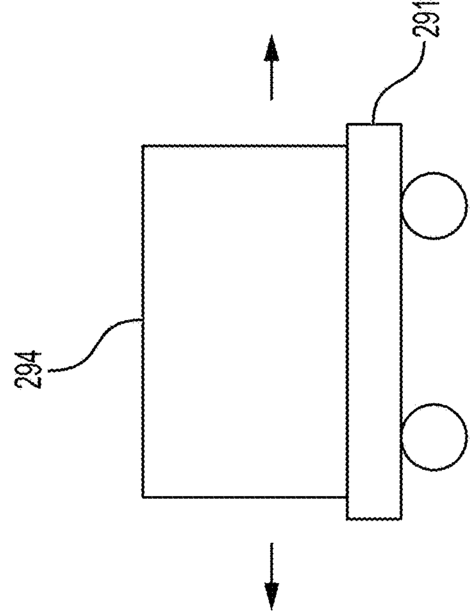
291
294
FIG. 6

800

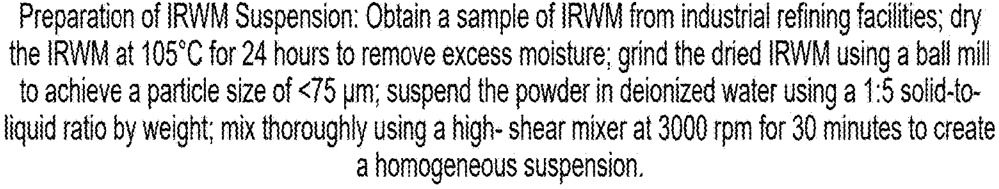

Citric Acid Treatment: add concentrated citric acid ($C_6H_8O_7$) to the suspension; use a molar ratio of 1.5 moles citric acid per mole of combined iron and aluminum present in the IRWM; stir the mixture continuously at 400 rpm for 3 hours at room temperature (20-25°C); allow the mixture to settle for 1 hour, filter using a vacuum filtration setup with a 0.45 µm membrane filter; collect the filtrate containing metal-citrate complexes for further processing.

820

Nitric Acid Addition: add concentrated nitric acid ($HNO_3$, 70% w/w) to the filtrate while stirring at 300 rpm until the pH of the solution reaches 1.5 ± 0.1; maintain stirring for 2 hours at room temperature to ensure complete formation of metal nitrates; monitor the reaction using UV-Vis spectroscopy to confirm breakdown of metal-citrate complexes.

830

Concentration by Evaporation: transfer the nitric acid-treated solution to a round-bottom flask; connect the flask to a rotary evaporator set at 100°C and at 1 atmosphere pressure; evaporate the solution until it reaches a thick gel-like consistency, typically reducing the volume by 80-90%; monitor the concentration process using viscometry to ensure consistency between batches.

840

Calcination (block 850): preheat a muffle furnace to 500°C; transfer the concentrated gel to alumina crucibles; place the crucibles in the preheated furnace and maintain the temperature at 500°C for 3 hours; allow the furnace to cool naturally to room temperature (typically 6-8 hours); collect the resulting solid product, primarily composed of metal oxides; grind the calcined product to a fine powder using a mortar and pestle.

SYSTEMS AND METHODS FOR MICROWAVE-DRIVEN CATALYTIC CONVERSION OF PLASTICS INTO CARBON BLACK MATERIALS AND GASES

RELATED APPLICATIONS

This application claims priority to U.S. Provisional Patent Application 63/682,939 filed Aug. 14, 2024, entitled "Methods for Producing Metal Oxide Catalysts from Industrial Refining Waste Materials for Microwave-Assisted Decomposition of Waste Plastics" and U.S. Provisional Patent Application 63/683,183, filed Aug. 14, 2024, entitled "Process of Plastics to Carbon Black and Gases by Using a Catalyst and Microwave Oven."

BACKGROUND

Industrial Refining Waste Materials (IRWM) include byproducts of various industrial refining processes. Disposal of IRWM poses environmental challenges due to the typically high alkalinity and potential for contaminating soil and water resources. Concurrently, the accumulation of waste plastics is a growing global environmental concern. Traditional recycling methods have limitations in terms of efficiency and the types of plastics that can be processed.

SUMMARY

A system for microwave-driven catalytic conversion of plastics into carbon black materials and gases includes a materials sorter configured to sort and remove metals from a batch of plastic materials; a metal detector configured to detect metals in the batch of plastic materials; a mixer configured to receive the batch of plastic materials and to receive a corresponding batch of nano-scale or micro-scale metal oxide catalysts, and further configured to produce a mixture comprising the plastic materials and the metal oxide catalysts to achieve an essentially uniform distribution of the metal oxide catalysts in the plastic materials; and a rotary microwave oven in communication with a microwave generator and configured to receive microwaves to heat contents of the rotary microwave oven. The rotary microwave oven receives the mixture, and a processor executes a program of instructions stored on a non-transitory, computer-readable storage medium to control operation of the rotary microwave oven. The heating heats the metal oxide catalysts, which in turn transfer heat to the plastic materials. The heat transfer vaporizes the plastic materials. The vaporized plastic materials produce one or more types of carbon black materials and one or more gases.

A system for microwave-assisted catalytic conversion of plastics into carbonaceous materials and gases. The system includes a materials sorter configured to sort and remove metals from a batch of plastic materials; a metal detector configured to detect metals in the batch of plastic materials; a mixer configured to receive the batch of plastic materials and to receive a corresponding batch of metal oxides, and further configured to produce a mixture comprising the plastic materials and the metal oxides to achieve an essentially uniform distribution of the metal oxides in the plastic materials; a rotary microwave oven in communication with a microwave generator and configured to receive microwaves to heat contents of the rotary microwave oven, wherein the rotary microwave oven receives the mixture; and a processor executing a program of instructions stored on a non-transitory, computer readable storage medium to control operation of the rotary microwave oven, wherein the heating heats the metal oxides, wherein heated metal oxides transfer heat to the plastic materials, wherein the heat transfer vaporizes the plastic materials, wherein the vaporized plastic materials produce one or more types of carbonaceous materials and one or more gases. In this system the metal-oxide particles may be chosen from the group consisting of $Fe_2O_3$, $Fe_3O_4$, NiO, CoO, $Co_3O_4$, mixed ferrites, and combinations thereof. The system further includes a metal-oxide fabrication facility, the facility including one or more pH-controlled stirred reactors; a filter press; a spray dryer; and a muffle or rotary kiln. Furthermore the rotary microwave oven is operated under an inert atmosphere and comprises a direct gas take-off configured to continuously remove pyrolysis vapors and permanent gases during operation.

A system for producing carbonaceous products from a feedstock, including a feedstock intake subsystem configured to receive a batch of feedstock material; a barcode scanner configured to read a barcode associated with the batch, the barcode encoding or referencing a recipe; a processor in communication with the barcode scanner, the processor configured to: retrieve the recipe encoded in or referenced by the barcode; and execute the recipe to control operation of the system from initiation to completion; one or more feedstock preparation components configured to alter a form or composition of the feedstock in accordance with the recipe; a catalytic reaction subsystem comprising a reactor configured to receive the prepared feedstock and to convert the prepared feedstock into one or more carbonaceous products in accordance with the recipe; and a product handling subsystem configured to collect the carbonaceous products produced by the reactor A method, implemented by a computer, for catalytic conversion of plastics into carbonaceous materials and gases, includes the computer controlling a materials sorter to sort and remove metals from a batch of plastic materials; operating a metal detector to detect metals in the batch of plastic materials; operating a mixer configured to receive the batch of plastic materials and to receive a corresponding batch of nano-scale or micro-scale metal oxide catalysts, and further configured to produce a mixture comprising the plastic materials and the metal oxide catalysts to achieve an essentially uniform distribution of the metal oxide catalysts in the plastic materials; operating a rotary microwave oven in communication with a microwave generator so as to receive microwave energy to heat contents of the rotary microwave oven; controlling a gas take-off system to remove generated gases from the rotary microwave oven, wherein the rotary microwave oven receives the mixture; wherein the heating heats the metal oxide catalysts, wherein heated metal oxide catalysts transfer heat to the plastic materials, wherein the heat transfer vaporizes the plastic materials, wherein the vaporized plastic materials produce one or more carbonaceous materials and one or more gases.

A method for microwave-assisted catalytic production of carbon nanotubes or few-layer graphene from plastic materials includes receiving a batch of plastic materials; sorting and removing metals from the batch of plastic materials; detecting residual metals in the batch of plastic materials; mixing the batch of plastic materials with a corresponding batch of metal-oxide particles comprising at least one transition-metal oxide selected from the group consisting of $Fe_2O_3$, $Fe_3O_4$, NiO, CoO, $Co_3O_4$, and mixed ferrites, the metal-oxide particles having an average particle size between about 50 nm and about 150 μm, the particle size selected based on microwave penetration depth at both cold-start and elevated operating temperatures, to form a substantially uniform mixture; feeding the mixture into a rotary microwave oven in communication with a microwave generator; operating the rotary microwave oven under an inert atmosphere to heat the contents with microwaves such that the metal-oxide particles preferentially absorb microwave energy and transfer heat to the surrounding plastic materials to induce pyrolysis and vaporization; controlling at least carbon activity, hydrogen partial pressure, pyrolysis vapor residence time, and catalyst surface morphology to promote carbon nanotube or few-layer graphene growth on catalyst surfaces; and recovering a solid carbonaceous product comprising: (a) for carbon nanotube production, at least 10% by mass carbon nanotubes having an average outer diameter between about 5 nm and about 50 nm; or (b) for few-layer graphene production, graphene sheets having fewer than 10 layers and a lateral dimension greater than 1 μm comprising at least 10% by mass of the solid carbonaceous product.

A system for microwave-assisted catalytic production of hydrogen gas from plastic materials includes a materials sorter configured to sort and remove metals from a batch of plastic materials; a metal detector configured to detect metals in the batch of plastic materials; a mixer configured to receive the batch of plastic materials and to receive a corresponding batch of metal-oxide particles comprising at least one transition-metal oxide selected from the group consisting of $Fe_2O_3$, $Fe_3O_4$, NiO, CoO, $Co_3O_4$, and mixed ferrites, the metal-oxide particles having an average particle size between about 50 nm and about 150 μm, the particle size selected based on microwave penetration depth at both cold-start and elevated operating temperatures, to form a substantially uniform mixture; a rotary microwave oven in communication with a microwave generator and configured to receive microwaves to heat contents of the rotary microwave oven under an inert atmosphere, wherein the rotary microwave oven receives the mixture; and a processor executing a program of instructions stored on a non-transitory, computer-readable storage medium to control operation of the rotary microwave oven, wherein the microwaves heat the metal-oxide particles, wherein the heated metal-oxide particles transfer heat to the plastic materials to induce pyrolysis and vaporization, wherein the processor controls at least temperature, residence time, sweep-gas flow rate, and vapor quenching rate to maximize hydrogen gas formation from pyrolysis vapors, and wherein the gaseous products withdrawn from the rotary microwave oven comprise hydrogen gas in a concentration of at least 40% by volume.

DESCRIPTION OF THE DRAWINGS

The detailed description refers to the following figures in which like numerals refer to like items, and in which:

FIG. 3A(1) to 3B(2) illustrate example components of the carbon conversion system of FIG. 2;

FIG. 6 illustrates an example tote sub-system;

FIG. 8 illustrates an example catalyst manufacturing process; and

DETAILED DESCRIPTION

Figure 1:
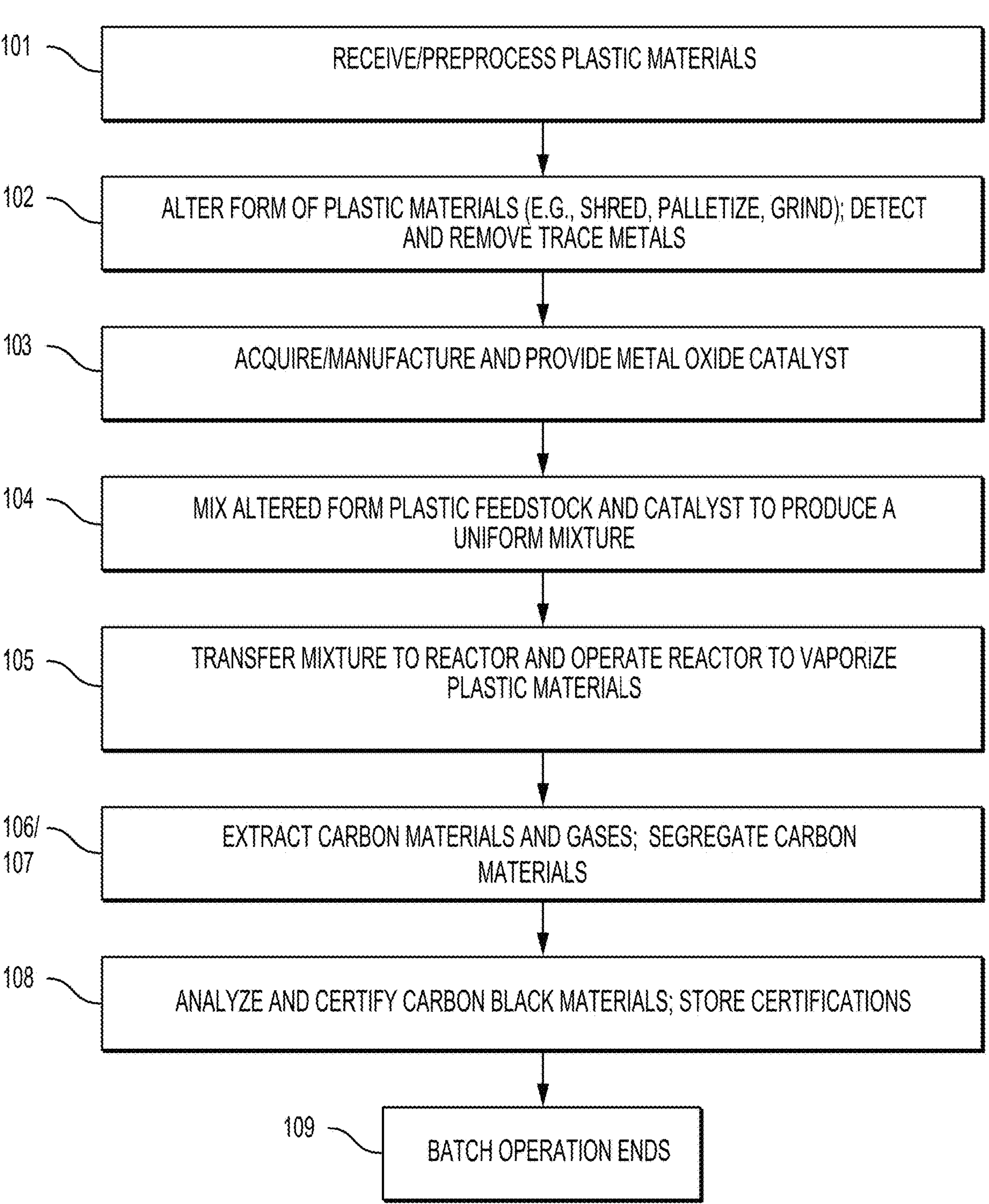
FIG. 1 is a flowchart illustrating an example carbon conversion process.

Industrial Refining Waste Materials (IRWM) are byproducts of various industrial refining processes such as bauxite mining and processing to produce alumina from bauxite ore. Bauxite processing produces a waste product (an IRWM) colloquially known as "red mud." Disposal of red mud and other IRWM poses environmental challenges due to their high alkalinity and potential for contaminating soil and water resources. Valorization of IRWM has been a subject of ongoing research, aiming to transform these waste materials into valuable resources. Concurrently, the accumulation of waste plastics is a growing global environmental concern. Traditional recycling methods are limited in terms of efficiency and the types of plastics that can be processed.

To address the above-noted environmental concerns and the processing limitations, disclosed herein are systems and methods for converting plastic waste materials, including materials commonly disposed of in landfills (e.g., thermoplastic, thermoset, and plastic hybrids) into useful materials with little or no further waste products resulting from the conversion. In an example, the systems and methods convert plastic waste materials into two useful products, namely carbon black materials/compositions, and a gas. The carbon black materials include graphite, graphene, carbon nanotubes, and iron carbide ($Fe_3C$). Example gases include hydrogen ($H_2$) and syngas.

Syngas (or synthesis gas) is a fuel gas mixture primarily composed of carbon monoxide (CO), hydrogen ($H_2$), and optionally carbon dioxide ($CO_2$), water vapor ($H_2O$), methane ($CH_4$), and other trace gases. A typical composition of syngas is (by volume percent): $H_2$: 25-60%; CO: 20-50%; $CO_2$: 1-15%; $CH_4$: 0-5%; and $N_2$: 0-5%. In microwave-assisted pyrolysis of plastics with limited oxygen, hydrogen concentrations typically trend toward the higher end of this range. Syngas is combustible because both CO and $H_2$ are fuels. Syngas may be produced by gasifying carbon-containing materials in a controlled amount of oxygen, air, or steam to partially oxidize the fuel rather than fully burn the fuel.

Also disclosed herein are methods for extracting and purifying metal oxides, primarily iron oxide ($Fe_2O_3$ and $Fe_3O_4$) and aluminum oxide ($Al_2O_3$), as well as "red mud," which is a byproduct of bauxite refining, through a series of chemical treatments and thermal processing steps. The resulting metal oxides are particularly suited for use as catalysts in microwave-driven decomposition of waste plastics. The herein disclosed microwave-driven decomposition of plastics provides an efficient and environmentally-friendly technology for converting waste plastics into valuable carbon materials, other chemicals, and fuels. Thus, the herein disclosed systems and methods address both environmental issues by providing an efficient and economically viable process to extract valuable metal oxides from IRWM and utilize the metal oxides in catalytic decomposition of waste plastics. The synergy between waste valorization and plastic recycling presents a novel approach to circular economy principles.

FIG. 1 is a flowchart illustrating an example carbon conversion process. The carbon conversion process may begin with producing or acquiring a suitable feedstock, applying a suitable catalyst to the feedstock, applying a suitable calcining method to the combined feedstock/catalyst mixture to cause carbon black materials and gases to separate, and then capturing the carbon black materials and the gases in suitable containers for subsequent use. The example carbon conversion process thus results in two (or more) distinct reusable products with little or no further, residual, remaining, or accompanying waste products. In an aspect, the example carbon conversion process follows a specific recipe, and the process is computer-controlled and monitored using inputs from specially designed sensors to adjust the process as needed and to ensure conformance with requirements for the final carbon black product or products. Furthermore, data from each completed process (i.e., each batch or batch series) may be stored, analyzed using machine learning techniques, and employed to revise/update the recipe used with the process or to generate a new process. Still further, the materials used with each carbon conversion process may be tracked; the tracking may produce data that are stored and retained with the batch data. The stored batch data, and a corresponding unique batch identifier, may be stored in a suitable data structure such as a non-consensus blockchain. Alternately, the batch identifier may be stored in the non-consensus blockchain, and the batch data may be stored in an off-chain data store referenced by the block containing the batch identifier.

In FIG. 1, carbon conversion process 100 begins, block 101, with receiving and pre-processing plastic materials, which may be plastic waste materials or plastic scrap materials. The plastic waste materials and plastic scrap materials may be recovered from various industrial processes, from landfills, and from environmental cleanup projects. The received plastic materials may be screened to ensure that the plastic materials are free of any metals, and to remove any metals present in the plastic materials, or to reject the plastic materials. The received plastic materials may be sorted according to types of plastic materials, such as thermoplastics and thermoset plastics. Alternatively, the received plastic materials may be left as a mixed feedstock.

In block 102, the form of pre-processed plastic materials is altered (if and as necessary) by one or more of shredding, pelletizing, and/or grinding into a set particle size based on a desired final product. In an example, as waste plastic is received, it may be separated into plastics of the same or similar composition. Alternatively, all received plastic materials may be processed as a single batch. In an aspect, the plastic materials may be segregated as specified in a particular recipe. Whether segregated or not segregated, the plastic materials are placed on a conveyor and run through a metal detector. If metals are detected (possibly above a threshold amount) the plastics are subjected to a metal removal component that may remove the detected metals (removal of trace metals is disclosed elsewhere herein). The thus-purged plastic materials then continue on the conveyor into a coarse grinder to turn plastic bottles, sheets, or other forms of plastic into small strips; for example, ¼ in. to ½ in. wide strips×½ in. to 1 in. long pieces. The coarse-ground plastic materials then run on another conveyor into a fine grinder that further reduces the plastic material sizes to, for example, ⅛ in. wide by 3/16 in. long pieces. The thus-processed plastic materials move by conveyor into a hopper bin. Once the hopper bin is full, the hopper bin may be replaced with another hopper bin, the filled-up hopper bin may be weighed, and the plastic materials categorized for addition to a rotary microwave oven. The plastics may be placed in a humidity-controlled area for storage prior to the heating process.

In block 103, process 100 involves manufacturing or selecting a suitable catalyst based on the material composition of the feedstock and the intended final product of process 100. The catalyst is, in an example, a metal oxide catalyst. Such catalysts are composed primarily of metal oxides (compounds of metals with oxygen) that promote or accelerate chemical reactions without being consumed in the process. Such catalysts can act either as active catalysts themselves or as supports for other catalytic species. The catalyst manufacturing aspect of block 103 is disclosed in detail with respect to FIG. 7. As an alternative to catalyst manufacturing, the process 100 may use a commercial off-the-shelf (COTS) catalyst. Once the catalyst is acquired or produced, it may be weighed and stored in stainless steel hopper bins in a climate-controlled area.

In block 104, the example carbon conversion process 100 involves mixing the catalyst of block 103 with the preprocessed and altered feedstock of block 101 and block 102. In an aspect, the mixing (block 104) is performed in a specially designed and/or constructed mixing vessel (e.g., a stainless steel mixing vessel that will not release any contaminants into the feedstock/catalyst, or in any way interact with the feedstock/catalyst) in which the catalyst and feedstock are mixed to an approximately homogeneous state. An example batch production process may be as follows: A hopper mixer machine may be either manual or automatic, depending on how many batches are run per day. Either way, the manual or automatic machine will be monitored using the same sensors, PLCs, and scale systems that cooperate to send information to barcode software program and server to control the quality of the process. A hopper filled with plastics may be weighed. The hopper machine then may remove a specified amount of plastics as per a batch process recipe. Once the plastics are weighed, the machine may automatically add a specified amount of catalyst into the same hopper/mixer. Once in the hopper/mixer, the materials may be mixed together for approximately ten minutes or until an essentially homogeneous mixture is achieved. This mixing is performed by a machine that has sensors for monitoring mixing speed and infusion of the catalyst throughout the plastics. For a manual mixer, an operator may manually fill the hopper/mixer until a scale indicates the appropriate weight is reached. Then the operator may insert the catalyst into the hopper/mixer until the appropriate weight ratio is reached. Then the operator operates the mixer until completion. At that point, the mixture is ready for insertion into the rotary microwave oven, and the hopper may automatically empty the mixture onto a conveyor that will feed the mixture into the rotary microwave oven. If multiple batches are being produced, each hopper bin may have an associated barcode, which may be affixed to the hopper bin and stored in a data store until production is ready for that batch.

In block 105, the homogeneous or near-homogeneous mixture of plastics and catalysts is transferred to a suitable conversion device or reactor. In an example, the conversion device is a rotary microwave reactor. Such a reactor is disclosed in more detail with respect to FIGS. 2, 3B(1), and 3B(2). In the reactor, the mixture is heated, leading simultaneously to formation of carbon black materials and generation of gases. In more detail, once the mixture is placed in a heating portion of the reactor, control parameters for the batch are set (in an example, under computer control according to a recipe); the control parameters may include rotation speed of the reactor, temperature ramp-up to a maximum temperature, maximum temperature hold time, and the timing and removal of gases produced in the reactor. As noted, the control parameters are provided in a specific recipe. When properly controlled (e.g., under computer control according to a specific recipe), the feedstock does not burn, but rapidly vaporizes to produce the desired carbon black products and the desired (or expected) gases. Once the reactor-based operation is complete, gases are completely extracted from the reactor followed by removal of the carbon black materials. Thus, in block 107, the gases may be (1) stored in a pressurized holding tank, or (2) transported by way of a piping system to a gas separation system where hydrogen gas is separated from syngas. Separated hydrogen gas may be stored in a fuel cell, and separated syngas may be stored in a pressurized tank.

In block 106, the carbon black materials may be transported to a separation facility in which various processes are used to separate the carbon black materials into graphite, graphene, carbon nanotubes, as well as carbon oxide and other catalyst-related materials, and each material type is analyzed for purity. The separation facility includes components and devices that may be used to separate the carbon black materials into graphite, graphene, and other carbon black products. The processes employed may include magnetic separation, dissolution, and nanoparticle screening. Carbon black material separation is disclosed elsewhere herein.

In block 108, the analyzed carbon black materials are certified as to purity, the certifications are stored in the blockchain and/or in the off-chain data store, and the carbon black materials are stored, or are packaged and shipped to customers. Following block 108, the batch operation ends, block 109.

Figure 2:
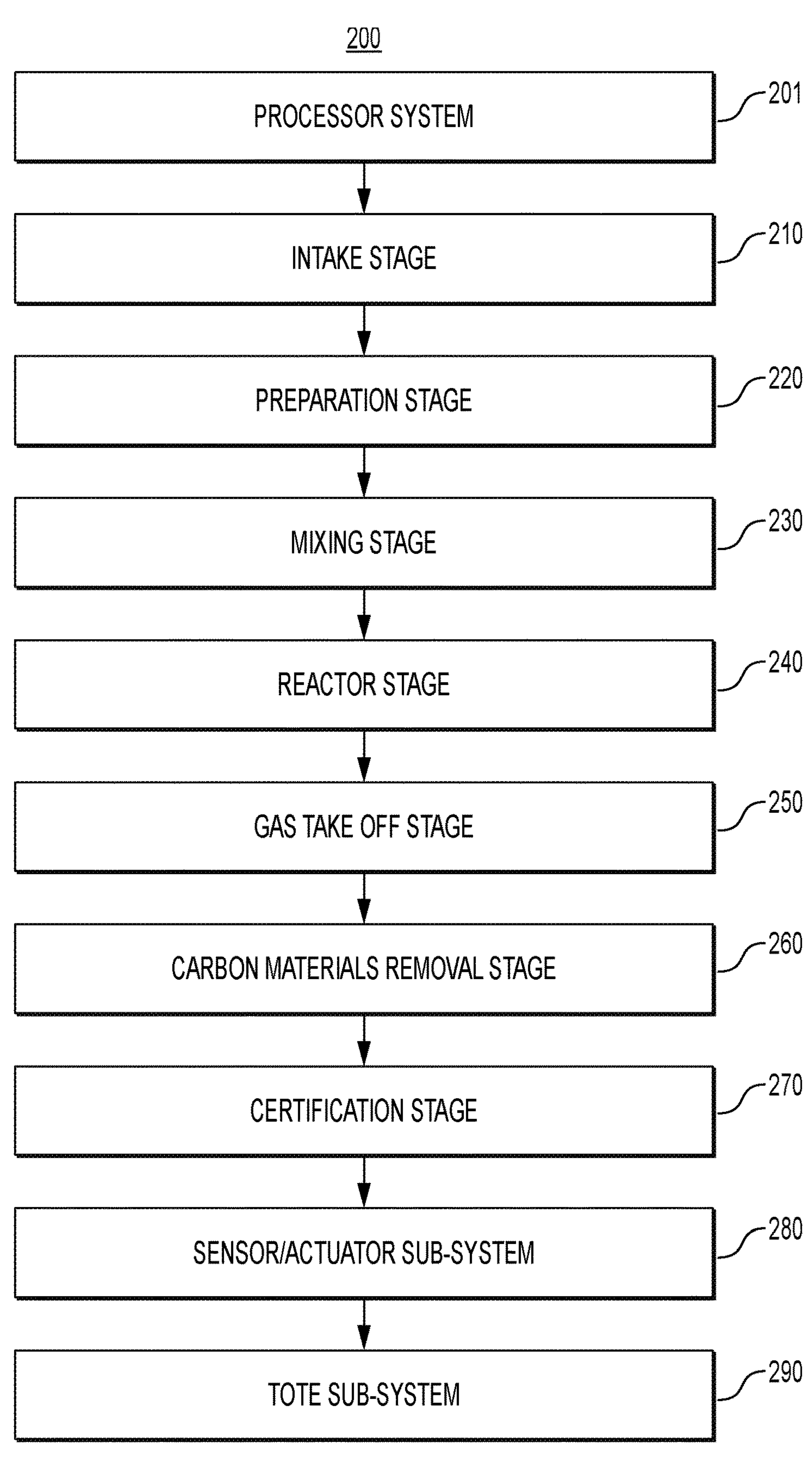
FIG. 2 is a block diagram of an example system for carbon conversion.

FIG. 2 is a block diagram of an example system for carbon conversion. In FIG. 2, carbon conversion system 200 includes processor-based system 201 (see FIG. 5A-5E) that may execute control some or all stages and sub-systems of the carbon conversion system 200. The carbon conversion system 200 further includes intake stage 210 in which plastic materials (i.e., feedstock) are received; preparation stage 220 in which feedstock is processed to alter the form of the feedstock for subsequent catalyst-based heating and vaporization; mixing stage 230 in which the processed feedstock is mixed with an appropriate catalyst; reactor stage 240 in which the feedstock/catalyst mixture is vaporized; gas take-off stage 250 in which gases produced in the reactor stage 240 are processed, stored, and shipped; carbon materials processing stage 260 in which carbon black materials are identified, sorted, and tested for purity; and certification stage 270, in which data relevant to the produced carbon black materials are associated with a particular feedstock batch and are stored in data structures that may be accessible to system operators, materials suppliers, customers, and regulators. The carbon conversion system 200 further includes a sensor/actuator sub-system 280 (see FIG. 4) and a tote sub-system 290. Finally, the carbon conversion system 200 may include a catalyst manufacturing system or a connection to a separate catalyst manufacturing system (not shown in FIG. 2; see FIG. 7).

The intake stage 210 includes a metal detector/removal component through which incoming feedstock is scanned to detect the presence of metals, and any metals may be removed. Depending on the concentration of metals in the feedstock, an incoming feedstock batch may be discarded, rejected, or subject to a separate metals removal process. The intake stage 210 further includes a mechanical separator that may operate to sort or segregate the feedstock into different types of plastic materials.

The preparation stage 220 is configured to alter feedstock form prior to catalyst-based heating and vaporization.

The mixing stage 230 involves the processed feedstock being mixed with an appropriate catalyst to produce an essentially uniform homogeneous distribution of catalysts in the plastics.

The reactor stage 240 includes a rotating, double-walled microwave oven with a direct gas take-off and a hatch that is opened to allow removal of carbon black materials. Components of the reactor stage 240 are shown in detail in FIG. 3B(1) and 3B(2). Some such components are operated automatically under control of processor-based system 201. Some such components are monitored by one or more sensors, and sensed values may be provided to the processor-based system 201, with the processor-based system 201 altering the programmed operation of the reactor stage components in response to the sensed values.

The gas take-off stage 250 is configured to remove gases produced in the reactor stage 240, and to process, store, and ship the produced gases.

The carbon materials processing stage 260 is configured to identify, sort, and test for purity carbon black materials.

The certification stage 270 is configured to certify analyzed carbon black materials and gas compositions as to their purity and other characteristics.

FIG. 3A(1) to 3B(3) illustrate example components of the system of FIG. 2. FIG. 3A(1) and 3A(2) are, respectively, top and side views of an example intake and preprocessing component. FIG. 3A(3) is an end-on view of a grinder. As shown, intake and preprocessing component 310 includes feedstock receive hopper 311, metal detector 312, conveyor 313, a first portion 313*a* of which is covered, a first stage, or coarse, grinder 314, a second stage, or fine grinder 315, and an output hopper 316.

FIG. 3A(1) and 3A(2) illustrate a metal detector 312. Not shown in the figures is a metal removal component. Including even trace amounts of metals in the rotary microwave oven can affect the efficiency of the carbon conversion process. To address this potential problem, batches of plastic materials may be screened in advance of the preprocessing, and any discovered metals removed. The metal detector 312 then may function as a back-up check for the presence of metals in the feedstock. Such a "pre-pre" processing operation may be warranted, especially since the provenance of the plastic waste materials may not be known, or, if known, trustworthy. In an aspect, the system 200 may incorporate a metal check and removal system (not shown) that includes several different layers and processes. For example, a metals check and removal system may include one or more of the following five stages, or portions thereof: (1) a pre-conditioning stage that includes a primary shredder (two-shaft) to ~50-100 mm; low speed, high torque to liberate metals; and a de-dusting and spark/metal detector on the shredder discharge to protect downstream components. (2) A ferrous removal (first pass) stage that employs (a) an overband (cross-belt) magnet above a main conveyor to pull out bulk ferrous; and (b) a magnetic head pulley or drum magnet immediately thereafter, to catch what the overband magnet misses. Note that this second stage will not remove stainless/non-ferrous metals and small/embedded pieces. (3) Non-ferrous removal (aluminum, copper, brass) using an eddy current separator (ECS). (4) An all-metal cleanup (stainless, wire hairs, embedded bits) inductive (all-metal) sensor sorter over a high-speed belt (2-4 m/s) with air-jet array. (5) Fines treatment (<5 mm) using a rare-earth drum magnet for fine ferrous metals and a gravity (free-fall) all-metal separator in a vertical chute for other fines.

FIGS. 3B(1) and 3B(2) are, respectively, top and side views of example rotating, double-walled, microwave oven component 330. The component 330 includes microwave unit 331, microwave conduit 332, safety unit 333, and a rotary oven. The rotary oven includes stationary portion 342 and rotating portion 346. Affixed to the stationary portion 342 is vacuum pump 352. Coupled to the rotating portion 346 is oven rotate motor 356.

Figure 4:
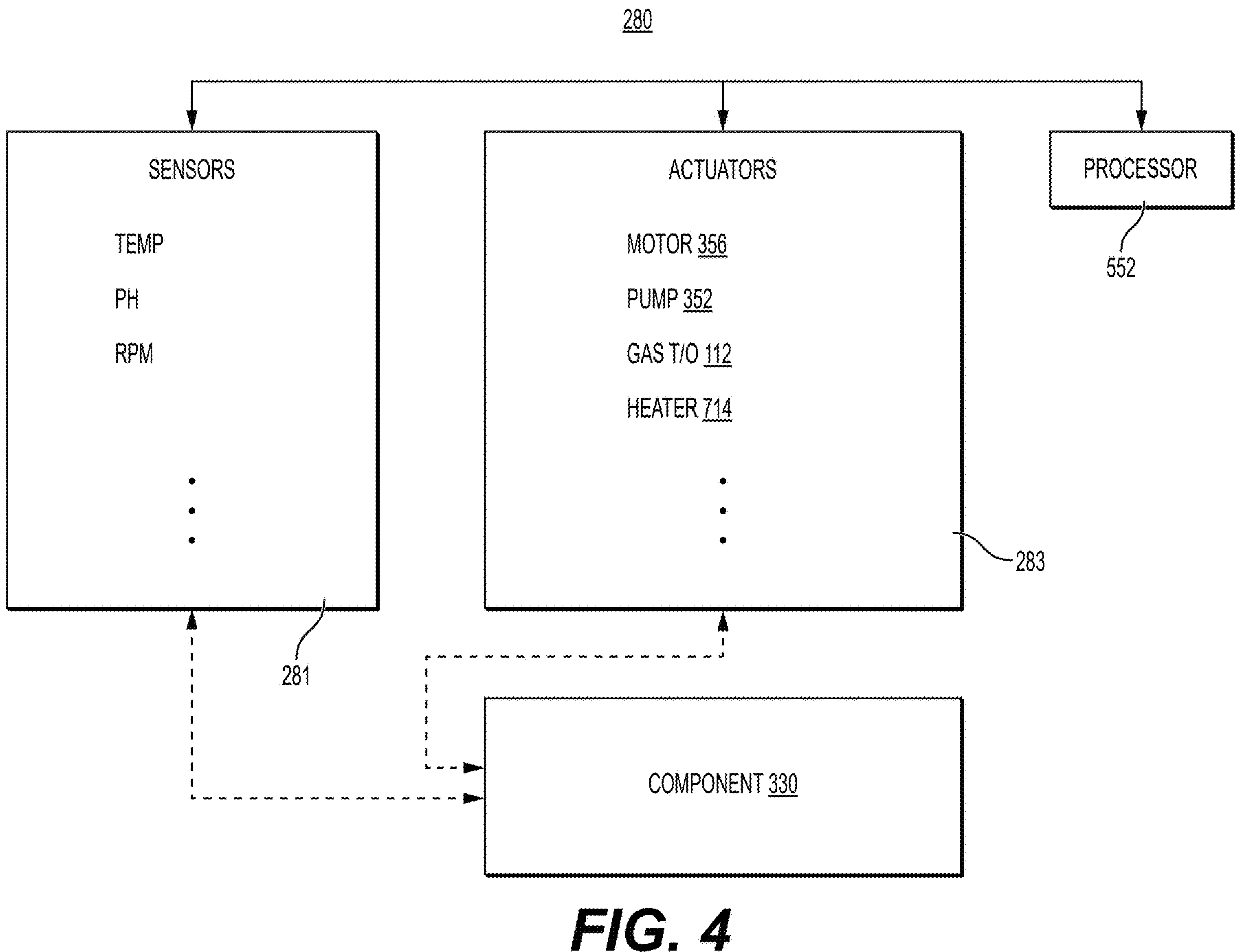
FIG. 4 illustrates an example sensor and actuator subsystem of the carbon conversion system of FIG. 2.

FIG. 4 illustrates example sensor/actuator sub-system 280. Specific devices, units, components, sub-systems, and systems disclosed herein may be configured with one or more sensors and one or more actuators. The sensors may be configured to sense parameter values and provide corresponding data and metadata to the processor 552. In an aspect, the actuators may be configured to receive control signals from the processor 552 and, in response to the received control signals, operate the components 310 and 330, and other components. In another aspect, the actuators may be configured to receive sensed parameter values directly from a sensor, and in response, operate to change, start, or stop an operation of an associated device, unit, component, or sub-system of the carbon conversion system 200 of FIG. 2 and/or the catalyst manufacturing system 700 (see FIG. 7).

Figure 5A:
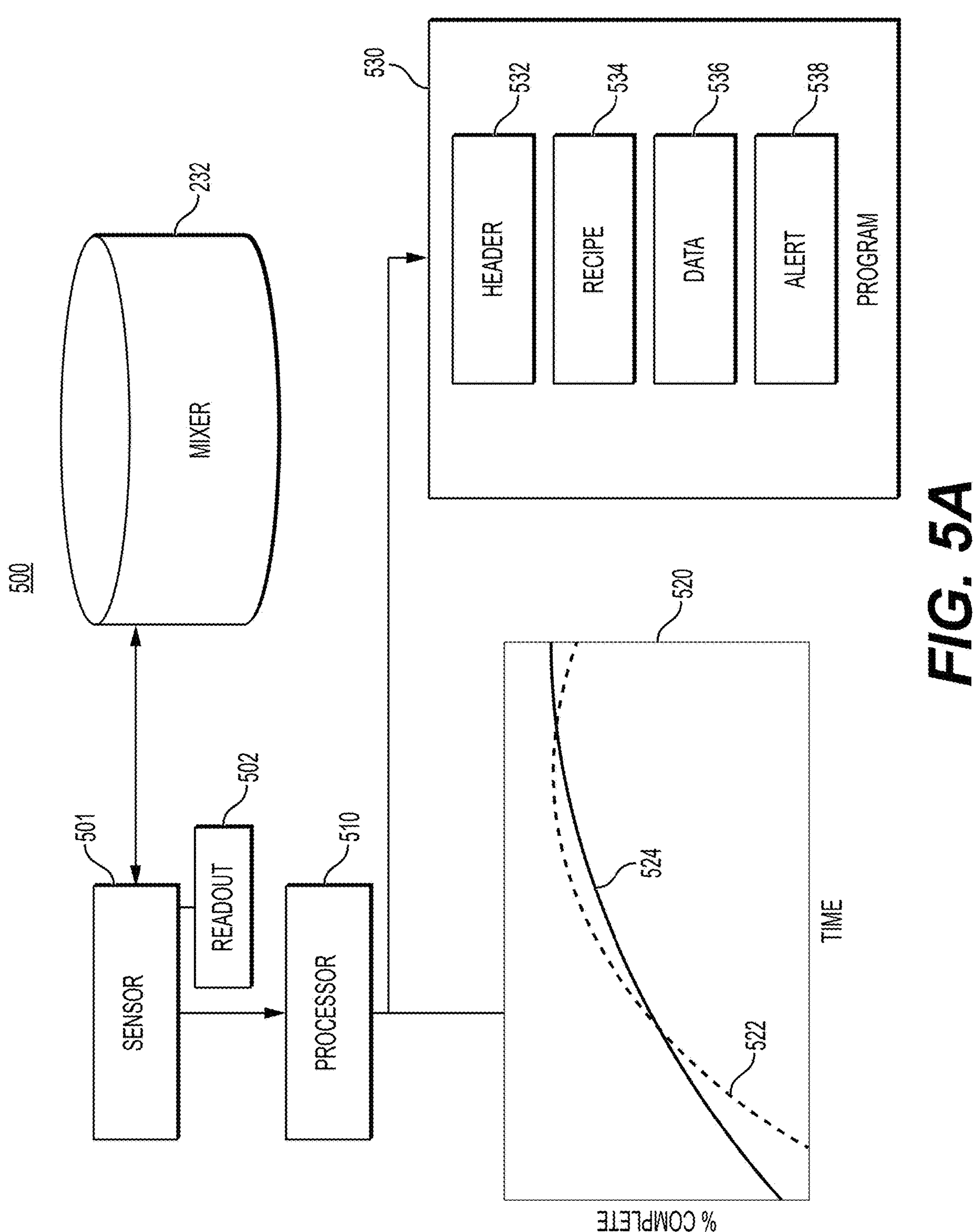
FIG. 5A-5E illustrate example processor-based control sub-systems.
Figure 5B:
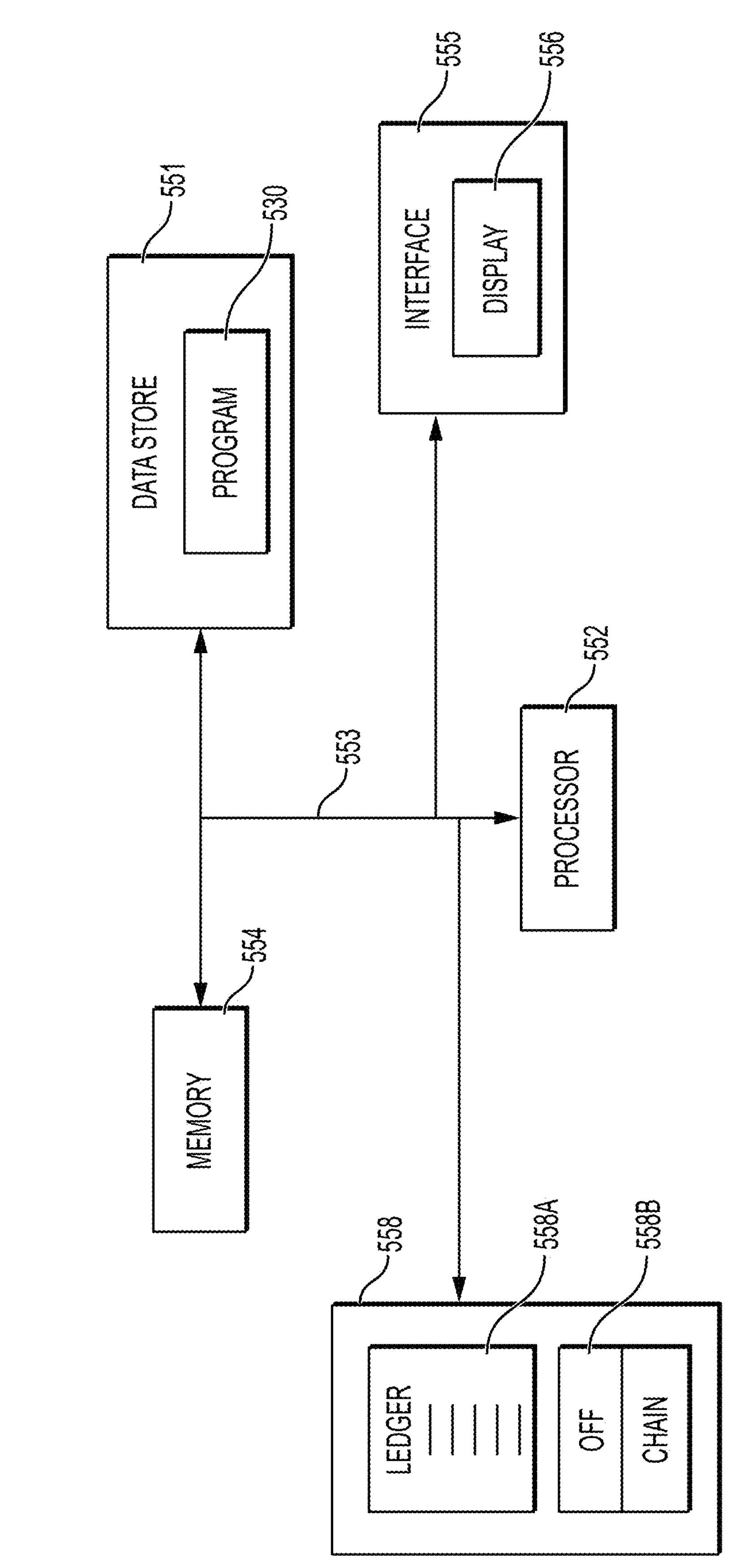
Figure 5C:
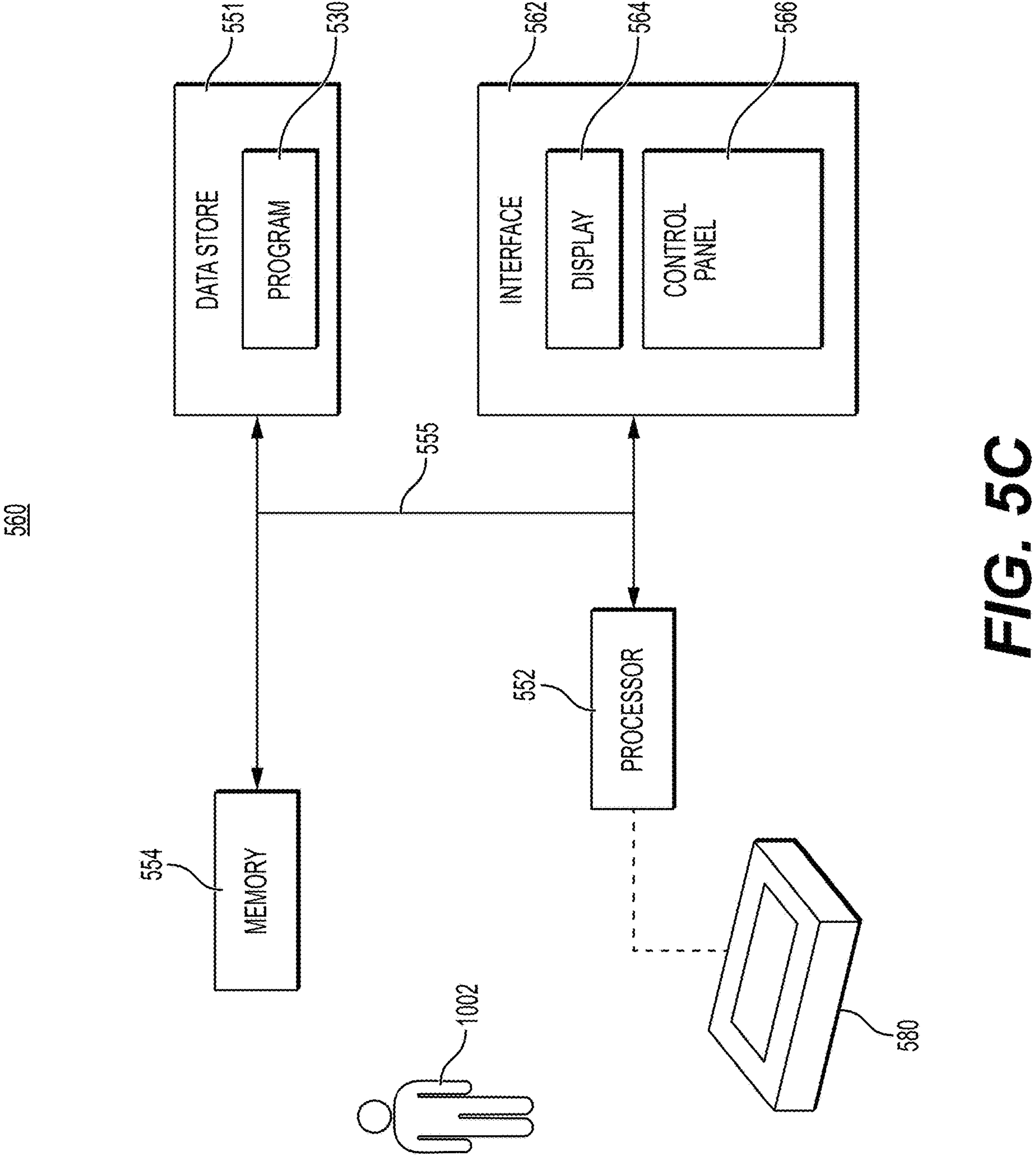

FIG. 5A-5E illustrate example processor-based systems. FIGS. 5A and 5B illustrate, respectively, an example sampling and analysis system 500, and a corresponding processing system 550. FIG. 5C illustrates an alternative processor system 560 that cooperates with the system 500 but includes a local processor unit 580 operated by worker/operator 1002, and is in communication with processor 552 to monitor, and in some aspects control, operations of the system 200.

Returning to FIG. 5A, example sampling and analysis system 500 is used in the carbon conversion system 200 to sense and control operation of various system components such as the components 310 and 330 and the system components of FIG. 2. In FIG. 5A, sampling and analysis system 500 includes a sensor 501 coupled to a mixer 232 used in operation of the system 200. For example, the sensor 501 may be coupled to the mixer 232 to control mixing of plastic materials and catalysts. The sensor 501 is coupled to readout 502 and may provide a visual or audible display through the readout 502. The sensor 501 provides sensed parameter values 522 to processor 510. The processor 510 is configured to compare (see graph 520) sensed parameter values 522 to expected parameter values 524 and optionally to apply that data to program 530. Central to the systems and control programs are (1) deterministic programming that provides real-time responses (machine control instructions) when needed, and (2) optional machine learning models including a large language model (LLM) that provides prompted responses or suggestions that ultimately may be invoked as machine control instructions. However, use of LLMs is most appropriate in situations in which trends in system performance may be sensed, analyzed, and evaluated (in some aspects, according to preset rules) as a preliminary step to generating a query (or prompt) for application to the LLM. In summary, the herein disclosed control program 530 may be best suited to taking deterministic actions, such as stopping a rotating machine. When monitored data from operation of the system 200 shows a "drift" or "slow divergence" (see graph 520) from historical norms for system operation, an alert 538 may be issued to notify operator/worker 1002. The program 530 may be instantiated on either a central processor system or one or more local processor units, or both the central processor system and one or more local control units.

In an aspect, the processor system of FIG. 5A, and in particular the program 530, may include a large language model (LLM) that may be executed to optimize performance of the system 200. The LLM is able to process and analyze data, and moreover, may be combined with specialized industrial control systems and machine learning models for direct operational control and optimization of the carbon conversion system through: (1) Interpretation and reporting in which the LLM helps operators interpret sensor data, generate summaries, and create actionable reports based on daily operations; execution of the LLM may identify patterns in performance data or flag unusual readings; (2) Preventive maintenance in which the LLM is combined with other machine learning models to analyze historical sensor data, and the LLM generates insights as to when certain equipment might need maintenance, thereby helping reduce downtime and increasing operational efficiency. (3) Process optimization in which the LLM is executed to analyze data and process documents, through which the LLM may provide suggested operational adjustments. For example, the LLM may recommend adjusting operating parameters of the rotary microwave oven to improve overall system efficiency based on past data or industry standards. (4) Real-Time communication in which the LLM provides an interface between operator/worker 1002 and carbon conversion system 200, responding to queries using a natural language processor. (5) Documentation and compliance in which the LLM generates and manages compliance documentation, helping ensure that the carbon conversion operations are documented and comply with environmental regulations as well as requirements of customers. For autonomous or semi-autonomous operation of the carbon conversion system 200, the LLM may be executed in conjunction with specialized process control algorithms or other models that support time-sensitive decisions based on real-time sensor data and that respond to the physical variables of the system 200.

The various types of plastic convert to different levels (percentages) of graphite and graphene. The system 200 may use various "recipes" (e.g., recipe 534) for processing different types of plastic. The operator/worker 1002 may scan a barcode on a work order or on a user interface, and the processor 510 will automatically set the process parameters. The process parameters may be determined by performing various DOEs (statistical design of experiments). Once scanned, the recipes 534 are programmed in a controller (e.g., a local processor unit 580 (see FIG. 5D)) which controls the processing parameters. Some of the parameters may be determined in real time based on laboratory results of the end product. The parameters may be controlled per machine and feed back to a central computer utilizing software such as Wonderware This will allow both local control and remote control of the parameters.

FIG. 5B illustrates an example processing system 550 that may be implemented within the system 200. In FIG. 5B, processing system 550 includes processor 552 coupled by communication bus 553 to memory 554, data store 551, interface 555, and database 558. The data store 551 may be, or may include, a non-transitory, computer-readable storage medium storing control and analysis program 530. The processor executes the program 530 to control aspects of the carbon conversion system 200 of FIG. 2. The interface 555 includes display 556 that enables an operator/worker to interface with the processor 552. The database 558 includes a ledger 558A, which may be a non-consensus or a consensus blockchain or other type of ledger, and an off-chain database 558B that may store data related to the system 500, and to the carbon black materials and the gases produced by the system 200, with the stored data referenced to a block in the blockchain or ledger 558A.

FIG. 5C illustrates an alternative processing system 560 that may be implemented within the system 200. The processing system 560 includes processor 552 that communicates with a remote, local processor unit 580, which is in turn operated by worker/operator 1002 in support of operation of the system 200. The processor 552 is in communication with memory 554, data store 551 (a non-transitory, computer-readable storage medium), and interface 562. Data store 551 includes control program 530, stored as machine-executable code. Interface 562 includes display 564 and control panel 566 (which may be a "soft key" panel). The operator/worker 1002 may control operation of the system 200 through activation of various soft keys on control panel 566. For example, the operator/worker 1002 may start and stop machines, control machine operation (e.g., adjust rpm), operate pumps, and conduct other system 200 operations. The control program 530, in addition to enabling communications between control panel 566 and components of the system 200, may activate automatic controls in certain situations. Finally, the operator/worker 1002 may use local processor unit 580 to control operations of select components of the system 200, to receive signals from components of the system 200, and to access various programs installed in the system 200.

Figure 5D:
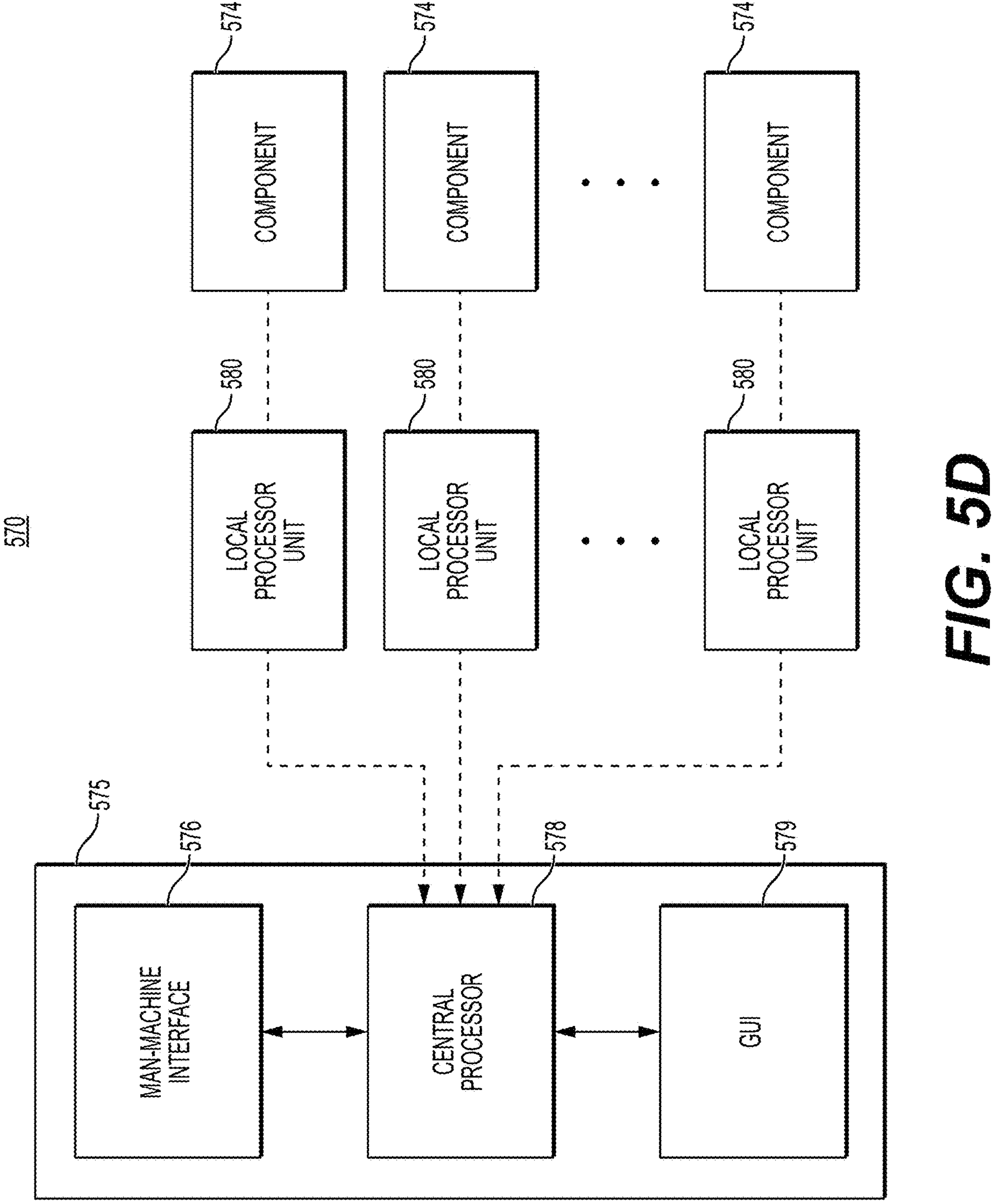

FIG. 5D illustrates an alternate implementation of an information and control system. In FIG. 5D, information and control system 570 includes processor platform 575, which in turn includes central processor 578, man-machine interface 576, and (human) graphical user interface 579. The central processor 578 communicates with components 574 through intermediary computing platforms, which may be small, local computing platforms (i.e., edge processors), purpose-built/supplied either to communicate between the central processor 578 and the components 574, or to perform specific information collection and distribution tasks, specific data analysis tasks, and specific component control tasks. As an example, a local processor unit 580 may be in wireless communication with components such as those shown in FIG. 3A(1) and 3A(2), and the local processor unit 580 may provide control signals to operate pumps, conveyor belts, and other components, and may receive feedback signals from the pumps and conveyor belts. Furthermore, the local processor unit 580 may execute software routines to analyze performance of its connected components based on the feedback signals and the sensor outputs. In an aspect, rather than executing software routines, the local processor unit 580 may be a hardware-based processing platform.

Figure 5E:
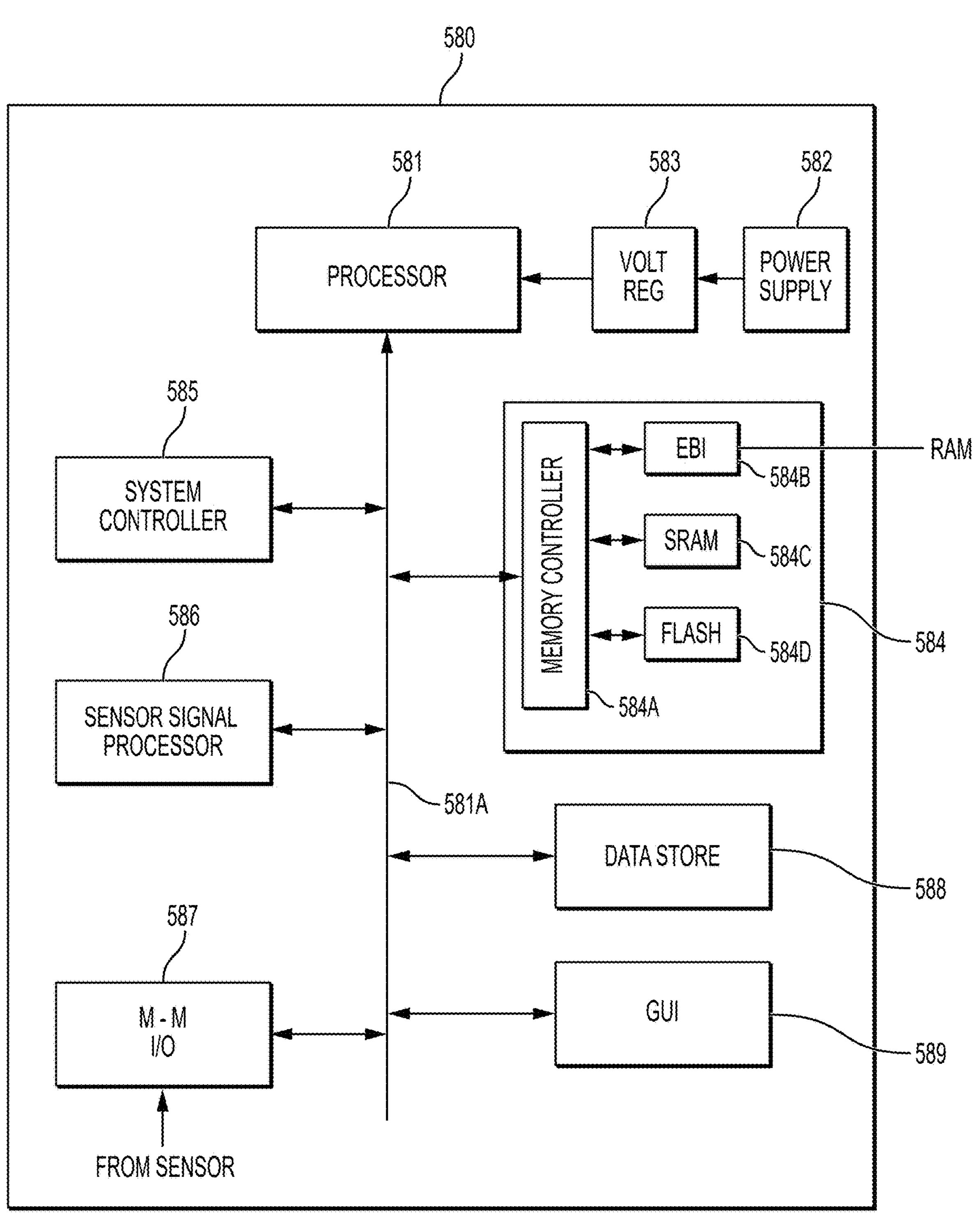

FIG. 5E illustrates an example of local processor unit 580. As can be seen in FIG. 5E, local processor unit 580 includes a processor 581, a power supply 582, voltage regulator 583, memory 584, system controller 585, sensor signal processor 586, machine-machine interface 587, human graphical user interface (GUI) 589, data store 588, which includes a non-transitory, computer-readable storage medium, and signal and power bus 581A. The power supply 582 may be a plug-in device and/or a wireless rechargeable battery or other suitable power supply. The voltage regulator 583 conditions power to voltages suitable for components of the local processor unit 580. Memory 584 includes memory controller 584A, and memory (storage) devices 584B-584D. The data store 588 includes a data log for storing sensor data and other data related to operation of the system 200 and a storage medium that includes programs and instructions for communicating with, operating, and controlling specific components of the system 200, and programs for analyzing data received from the specific components. The machine-machine interface 587 enables communications with other computing platforms and with the specific components. The GUI 589 enables man-machine communications, including visual, audio, and text-based information from the local processor unit 580, and text and audio communication from the user.

FIG. 6 illustrates example tote sub-system 290. The tote sub-system includes multiple movable carts (totes) 291, movable hoppers 292 (also totes), and multiple non-movable hoppers 293. The carts 291 may include hoppers 294 for carrying raw materials, semi-processed materials, and final products. The cart-based hoppers 294, the movable hoppers 292, and the non-movable hoppers 293 may be operated to dump their contents. In an aspect, the carts 291 are moved by hand and their hoppers 294 also are operated by hand. In another aspect, the carts 291 are equipped with remotely controlled propulsion systems (e.g., battery-powered electric motors), and are automated to follow pre-planned.

As noted above, the feedstock (plastic waste) is mixed with a suitable catalyst that can be heated in a microwave oven and transfer that heat to the mixed plastic materials to vaporize the plastics leaving two primary products, namely certain gases and certain carbon black solid materials. Thus, the microwave oven feed composition begins as plastic mixed with metal oxide catalysts that are very small in diameter. The mixture is placed in a rotary microwave double-walled oven, which reaches internal temperatures of approximately 2000° F. (~1093° C.) in an inert atmosphere such as nitrogen or argon to prevent combustion. The catalyst particles are specifically configured to absorb microwave energy, which causes high heating and vaporization of the plastic materials. Vaporization of the plastic materials leaves behind hydrogen gas and syngas, and the three carbon black materials disclosed herein. This microwave coupling via tiny (micro or nano-scale) metal oxide particles is possible because certain transition-metal oxides (e.g., $Fe_3O_4/Fe_2O_3$, NiO, CoO) have appreciable microwave loss and act as susceptors, absorbing microwave energy such that the metal oxides heat first and then transfer heat to nearby plastic materials.

The basic conversion equation is: plastic+catalyst→vapors+solid carbon. Under inert conditions (the microwave oven operates with an inert internal environment), plastic materials undergo microwave-assisted pyrolysis to cracking vapors ($C_1$-$C_4$ hydrocarbons, olefins, aromatics), producing some gases such as $H_2$, $CO/CO_2$ (from oxygen in the polymer or residual moisture), and solid carbon. The solid carbon can partially graphitize at temperatures in the range of ~1900-2000° F., especially with Fe/Ni/Co present.

The produced solid carbon materials also may be in the form of graphene or carbon nanotubes. Formation of these two carbon materials may require transition-metal micro- or nano-particles (Fe/Ni/Co) and a specific right carbon activity+$H_2$ partial pressure to grow CNTs or few-layer graphene from pyrolysis vapors (a microwave-assisted CVD-like regime). Without tuning, the solid carbon black materials may be mostly amorphous/turbostratic carbon with some graphitic domains. Thus, the carbon conversion process 100 of FIG. 1 may be "tuned" at least in part by use of an appropriate catalyst; appropriate in terms of size (e.g., nano-scale 10-100 nm or micro-scale 10-100 μm) and in terms of composition (e.g., $Fe_3O_4/Fe_2O_3$, NiO, CoO).

Figure 7:
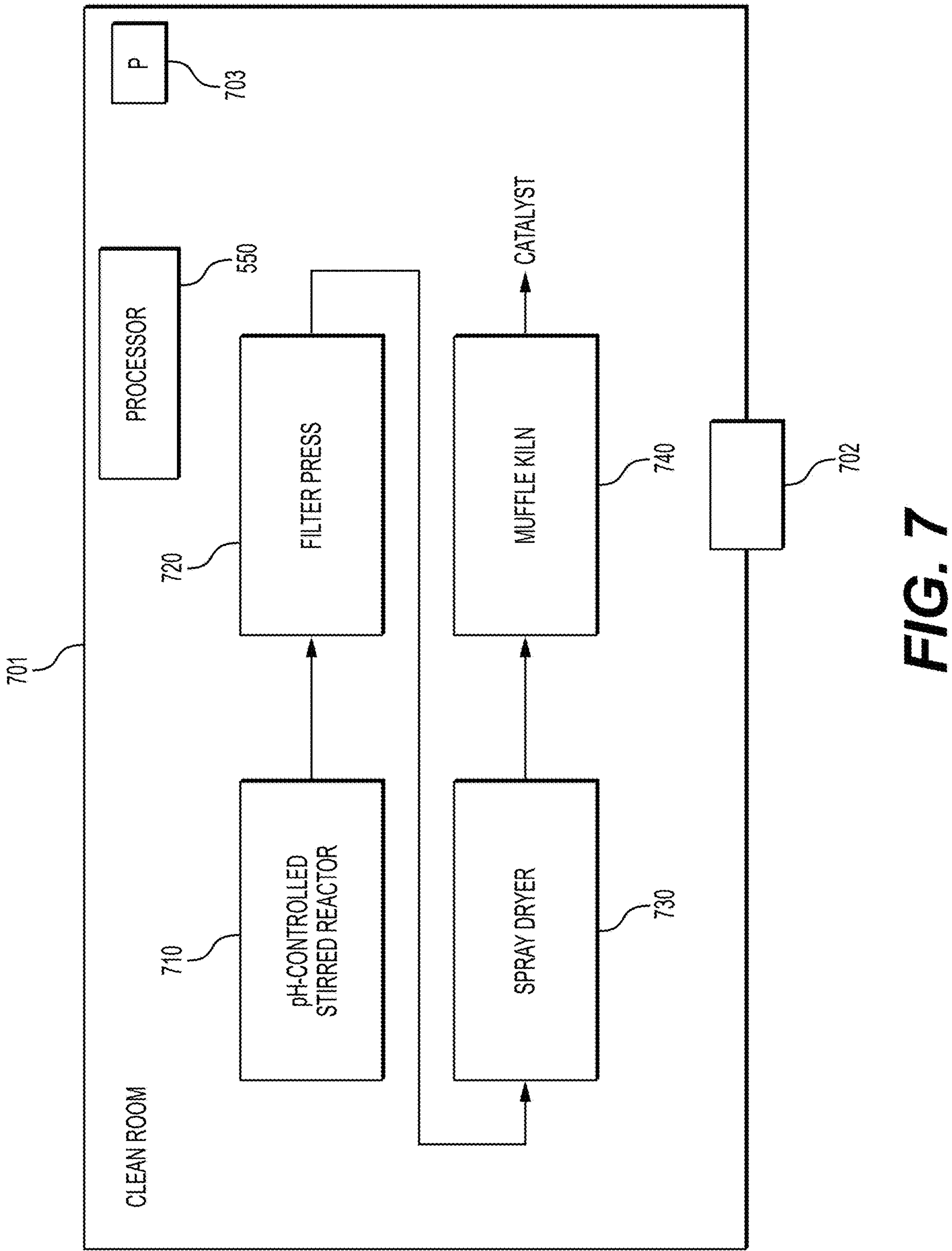
FIG. 7 illustrates an example catalyst manufacturing system.

FIG. 7 illustrates an example catalyst manufacturing system that is configured to, and may be operated to, support production of specific carbon black materials and corresponding gases through specific catalyst engineering. In FIG. 7, catalyst manufacturing system 700 may be implemented in a clean room 701. The clean room 701 may include access points 702 that prevent or limit possible contamination. The clean room 701 may implement a positive pressure source 703 to maintain ambient pressure in the clean room 701 higher than ambient surroundings. Components of the catalyst manufacturing system 700 may provide the ability to produce high-purity metal oxide compounds from IRWM, which may subsequently be used as catalysts for microwave-assisted decomposition of waste plastics using the system 200 of FIG. 2. The catalyst manufacturing system 700 may be largely or entirely automated and may operate under control of a specially programmed and trained processor 705. The processor 705 may execute a program of instructions, stored on a non-transitory computer-readable storage medium (not shown in FIG. 7) to perform or facilitate the following general steps: (1) preparation of an IRWM suspension; (2) treatment with citric acid to form metal-citrate complexes; (3) addition of nitric acid to break down the complexes and form metal nitrates; (4) concentration of the solution by evaporation; and (5) calcination to produce metal oxides. The steps implemented under control of the processor 705 offer advantages in terms of efficiency, product purity, and environmental sustainability compared to existing techniques for processing IRWM for subsequent application to waste plastics.

Moreover the processor controls the hydrogen partial pressure within the rotary microwave oven to remain between about 0.05 atm and about 0.3 atm during CNT or graphene growth. The processor controls the pyrolysis vapor residence time within the rotary microwave oven to remain between about 1 second and about 10 seconds for CNT growth, or between about 0.5 second and about 5 seconds for few-layer graphene growth.

In view of the foregoing, an example metal oxide catalyst production process 800 includes the following steps as shown in FIG. 8:

Preparation of IRWM Suspension (block 810).

Obtain a sample of IRWM from industrial refining facilities.

Dry the IRWM at 105° C. for 24 hours to remove excess moisture.

Grind the dried IRWM using a ball mill to achieve a particle size of <75 μm.

Suspend the powder in deionized water using a 1:5 solid-to-liquid ratio by weight.

Mix thoroughly using a high-shear mixer at 3000 rpm for 30 minutes to create a homogeneous suspension.

Citric Acid Treatment (block 820).

Add concentrated citric acid ($C_6H_8O_7$) to the suspension.

Use a molar ratio of 1.5 moles citric acid per mole of combined iron and aluminum present in the IRWM.

Stir the mixture continuously at 400 rpm for 3 hours at room temperature (20-25° C.).

Allow the mixture to settle for 1 hour, then filter using a vacuum filtration setup with a 0.45 μm membrane filter.

Collect the filtrate containing metal-citrate complexes for further processing.

Nitric Acid Addition (block 830).

Gradually add concentrated nitric acid ($HNO_3$, 70% w/w) to the filtrate while stirring at 300 rpm.

Continue adding nitric acid until the pH of the solution reaches 1.5±0.1.

Maintain stirring for 2 hours at room temperature to ensure complete formation of metal nitrates.

Monitor the reaction using UV-Vis spectroscopy to confirm the breakdown of metal-citrate complexes.

Concentration by Evaporation (block 840).

Transfer the nitric acid-treated solution to a round-bottom flask.

Connect the flask to a rotary evaporator set at ~100° C. under reduced pressure.

Evaporate the solution until it reaches a thick gel-like consistency, typically reducing the volume by 80-90%.

Monitor the concentration process using viscometry to ensure consistency between batches.

Calcination (block 850).

Preheat a muffle furnace to 500° C.

Transfer the concentrated gel to alumina crucibles.

Place the crucibles in the preheated furnace and maintain the temperature at 500° C. for 3 hours.

Allow the furnace to cool naturally to room temperature (typically 6-8 hours).

Collect the resulting solid product, primarily composed of metal oxides.

Grind the calcined product to a fine powder using a mortar and pestle.

Figure 9:
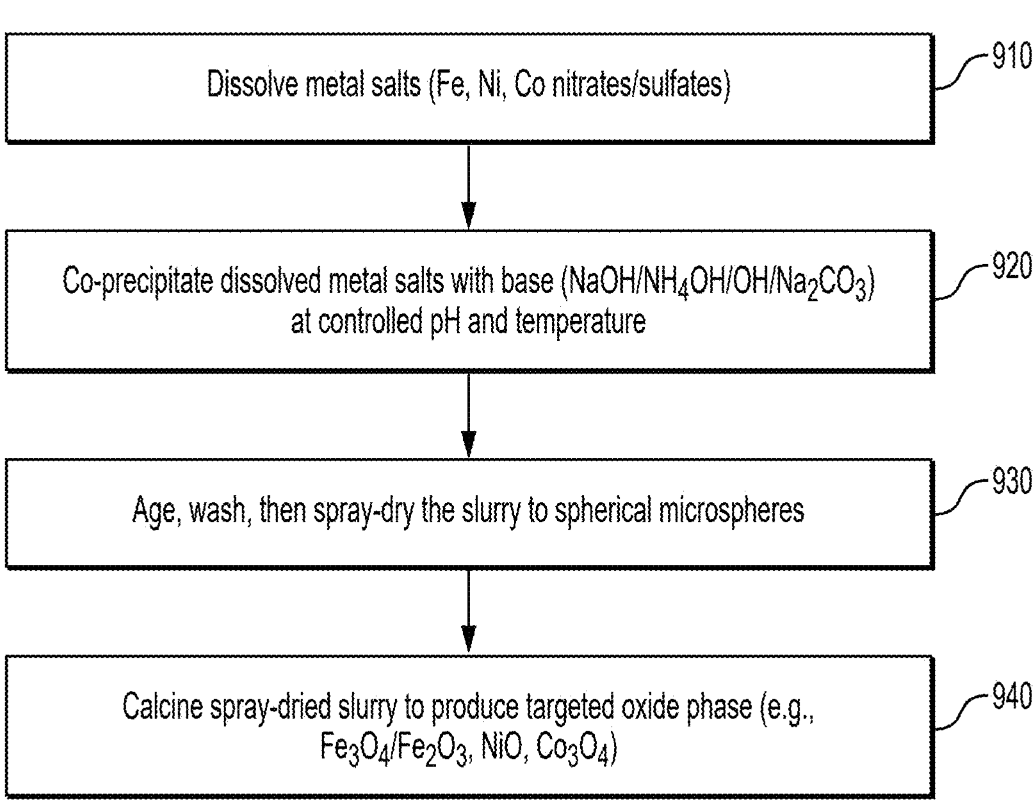
FIG. 9 illustrates an industrial-scale catalyst manufacturing process.

The inventors have shown that the above steps, in a laboratory setting, produce the desired metal oxide catalyst. To transfer the concepts embodied in the above steps to an industrial scale production, FIG. 9 presents an example industrial-scale process 900 to produce micro-scale (1-200 μm) Fe/Ni/Co metal-oxide catalyst particles that couple well to 2.45 GHz microwaves, and have an upper size limit that avoids problems such as microwave field non-uniformity or incomplete heating in the rotating microwave oven. In FIG. 9, process 900 begins, block 910, with dissolving metal salts (Fe, Ni, Co nitrates/sulfates). In block 920, co-precipitate the metal salts with a base ($NaOH/NH_4OH/Na_2CO_3$) at a controlled pH and temperature. In block 930, age, wash, and then spray-dry the slurry to form spherical microspheres. In block 940, calcine to targeted oxide phase (e.g., $Fe_3O_4/Fe_2O_3$, NiO, $Co_3O_4$). The co-precipitation of block 920 provides composition control; the spray-drying of block 930 sets the particle size ($D_{50}$ ~10-100 μm) and sphericity; the calcination of block 940 fixes phase/porosity. Use of co-precipitation+spray-drying makes possible porous 20-80 μm Fe/Ni/Co oxide microspheres (or ferrites) and keeps the upper size ≤100-150 μm at 2.45 GHz so as to produce clean, uniform microwave heating in the rotating microwave oven. This sizing is anchored to penetration-depth data (e.g., $Fe_3O_4$ $\delta p \approx 80$ μm) and gets more conservative at temperature.

As should be appreciated from the above disclosure, the disclosed systems and methods are capable of any type of carbonaceous materials. For example, for carbon nanotube production, at least 80% of the carbon nanotubes have a chiral vector index (n, m) corresponding to a chiral angle between about 10° and about 30°. Moreover for carbon nanotube production, the carbon nanotubes have a length-to-diameter aspect ratio of at least 500:1. For few-layer graphene production, the graphene sheets have a Raman D/G intensity ratio of less than 0.2 and a 2D/G intensity ratio greater than 2. Furthermore for few-layer graphene production, at least 80% of graphene sheets have fewer than 5 layers.

The system the metal-oxide particles comprise a blend of $Fe_3O_4$ and NiO in a weight ratio between about 2:1 and about 10:1. The metal-oxide particles comprise a blend of $Fe_3O_4$, NiO, and CoO, each present in an amount between about 5% and about 60% by weight of total metal-oxide content. The catalyst particles have a porosity between about 20% and about 60% by volume to enhance surface area for CNT or graphene nucleation. Furthermore, the catalyst surface morphology is maintained in a reduced metallic state prior to CNT or graphene growth by in situ reduction with hydrogen gas at a temperature between about 500° C. and about 700° C.

Returning to FIG. 7, the system 700 includes one or more pH-controlled stirred reactors 710, a filter press 720, a spray dryer (two-fluid/nozzle or rotary atomizer) 730, and a muffle/rotary kiln 740.

Viewing the above description, a person of ordinary skill in the art (POSITA) would understand that the disclosed inventions include a system for microwave-assisted catalytic conversion of plastics into carbonaceous materials and gases. The system includes a materials sorter configured to sort and remove metals from a batch of plastic materials; a metal detector configured to detect metals in the batch of plastic materials; a mixer configured to receive the batch of plastic materials and to receive a corresponding batch of metal oxides, and further configured to produce a mixture comprising the plastic materials and the metal oxides to achieve an essentially uniform distribution of the metal oxides in the plastic materials; a rotary microwave oven in communication with a microwave generator and configured to receive microwaves to heat contents of the rotary microwave oven, wherein the rotary microwave oven receives the mixture; and a processor executing a program of instructions stored on a non-transitory, computer readable storage medium to control operation of the rotary microwave oven, wherein the heating heats the metal oxides, wherein heated metal oxides transfer heat to the plastic materials, wherein the heat transfer vaporizes the plastic materials, wherein the vaporized plastic materials produce one or more types of carbonaceous materials and one or more gases. In this system the metal-oxide particles may be chosen from the group consisting of $Fe_2O_3$, $Fe_3O_4$, NiO, CoO, $Co_3O_4$, mixed ferrites, and combinations thereof. The system further includes a metal-oxide fabrication facility, the facility including one or more pH-controlled stirred reactors; a filter press; a spray dryer; and a muffle or rotary kiln. Furthermore the rotary microwave oven is operated under an inert atmosphere and comprises a direct gas take-off configured to continuously remove pyrolysis vapors and permanent gases during operation and localized catalyst-particle surface temperatures reach up to about 2000° F. while a bulk reactor temperature is controlled between about 800° C. and about 1200 The processor is further configured to execute a recipe specifying at least one of: rotation speed, microwave power profile, temperature ramp rate, maximum temperature and hold time, inert sweep flow rate, and gas take-off timing. The mixer and rotary microwave oven are instrumented with sensors configured to provide signals to the processor, and the processor is configured to adjust operation based on the signals. The metal-oxide particles are formed as microspheres having D50 between about 10 μm and about 100 μm formed by spray drying and calcination. The system is capable of producing carbonaceous solid materials including amorphous carbon black, graphitic carbon, graphene, carbon nanotubes, and iron carbide. In an aspect of the system, the materials sorter and metal detector are part of a multi-stage metals-removal subsystem that includes a primary shredder configured to reduce feedstock to particles of about 50-100 mm and liberate embedded metals; an overband magnet and a magnetic head pulley for bulk ferrous removal; an eddy-current separator for removal of non-ferrous metals; an inductive all-metal sensor sorter with an air-jet array for removal of stainless steel and embedded metallic fragments; and a fines treatment stage comprising a rare-earth drum magnet and a gravity free-fall all-metal separator. In the system the particle-size distribution of the metal-oxide particles is selected based on microwave penetration depth at both cold-start and elevated operating temperatures, such that a Dmax is no greater than about 150 μm at 2.45 GHz to ensure uniform heating and the penetration depth of the metal-oxide particles at operating temperature is at least twice the mean particle diameter. The processor is configured to reject or divert a feedstock batch when the detected total metal content exceeds a predetermined threshold, to integrate real-time sensor data from the reactor stage, mixing stage, and gas take-off stage into a feedback control loop that adjusts at least one of microwave power, rotation speed, sweep-gas flow, or gas take-off rate to execute predictive maintenance algorithms trained on historical sensor data to schedule maintenance before component failure.

The POSITA would further understand that the disclosed inventions relate to a system for microwave-assisted catalytic production of solid carbonaceous products including carbon nanotubes and few-layer graphene from plastic materials that includes a materials sorter configured to sort and remove metals from a batch of plastic materials; a metal detector configured to detect metals in the batch of plastic materials; a mixer configured to receive the batch of plastic materials and to receive a corresponding batch of metal-oxide particles comprising at least one transition-metal oxide selected from the group consisting of $Fe_2O_3$, $Fe_3O_4$, NiO, CoO, $Co_3O_4$, and mixed ferrites, the metal-oxide particles having an average particle size between about 50 nm and about 150 μm, the particle size selected based on microwave penetration depth at both cold-start and elevated operating temperatures; a rotary microwave oven in communication with a microwave generator and configured to receive microwaves to heat contents of the rotary microwave oven under an inert atmosphere, wherein the rotary microwave oven receives the mixture; and a processor executing a program of instructions stored on a non-transitory, computer-readable storage medium to control operation of the rotary microwave oven. The microwaves heat the metal-oxide particles, the heated metal-oxide particles transfer heat to the plastic materials to induce pyrolysis and vaporization, and the processor controls at least carbon activity, hydrogen partial pressure, pyrolysis vapor residence time, and catalyst surface morphology to promote carbon nanotube or few-layer graphene growth on catalyst surfaces. The system is capable of programming to recover from the waste plastics specific solid carbonaceous products that include, inter alia, for carbon nanotube production, at least 10% by mass carbon nanotubes having an average outer diameter between about 5 nm and about 50 nm; and for few-layer graphene production, graphene sheets having fewer than 10 layers and a lateral dimension greater than 1 μm comprising at least 10% by mass of the solid carbonaceous product.

The preceding disclosure refers to flowcharts and accompanying descriptions to illustrate the system, component, and device examples represented in the Figures. The disclosed devices, components, and systems contemplate using or implementing any suitable technique for performing the steps illustrated. Thus, the flowcharts are for illustration purposes only and the described or similar steps may be performed at any appropriate time, including concurrently, individually, or in combination. In addition, many of the steps in the flowcharts may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs; i.e., one or more modules of computer program instructions, encoded on a non-transitory computer-readable storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer-readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for microwave-assisted catalytic conversion of plastics into carbonaceous materials and gases, comprising:

- a materials sorter configured to sort and remove metals from a batch of plastic materials;
- a metal detector configured to detect metals in the batch of plastic materials;
- a mixer configured to receive the batch of plastic materials and to receive a corresponding batch of metal oxides, and further configured to produce a mixture comprising the plastic materials and the metal oxides to achieve an essentially uniform distribution of the metal oxides in the plastic materials;
- a rotary microwave oven in communication with a microwave generator and configured to receive microwaves to heat contents of the rotary microwave oven, wherein the rotary microwave oven receives the mixture; and
- a processor executing a program of instructions stored on a non-transitory, computer readable storage medium to control operation of the rotary microwave oven, wherein the heating heats the metal oxides, wherein heated metal oxides transfer heat to the plastic materials, wherein the heat transfer vaporizes the plastic materials, wherein the vaporized plastic materials produce one or more types of carbonaceous materials and one or more gases.

2. The system of claim 1, wherein metal-oxide particles are chosen from the group consisting of $Fe_2O_3$, $Fe_3O_4$, NiO, CoO, $Co_3O_4$, mixed ferrites, and combinations thereof.

3. The system of claim 1, further comprising a metal-oxide fabrication facility, the facility comprising: one or more pH-controlled stirred reactors; a filter press; a spray dryer; and a muffle or rotary kiln.

4. The system of claim 1, wherein the rotary microwave oven is operated under an inert atmosphere and comprises a direct gas take-off configured to continuously remove pyrolysis vapors and permanent gases during operation.

5. The system of claim 1, wherein localized catalyst-particle surface temperatures reach up to about 2000° F. while a bulk reactor temperature is controlled between about 800° C. and about 1200° C.

6. The system of claim 1, wherein the one or more gases comprise hydrogen and syngas.

7. The system of claim 1, wherein the processor is further configured to execute a recipe specifying at least one of: rotation speed, microwave power profile, temperature ramp rate, maximum temperature and hold time, inert sweep flow rate, and gas take-off timing.

8. The system of claim 1, wherein the mixer and rotary microwave oven are instrumented with sensors configured to provide signals to the processor, and the processor is configured to adjust operation based on the signals.

9. The system of claim 1, wherein metal-oxide particles comprise microspheres having D50 between about 10 μm and about 100 μm formed by spray drying and calcination.

10. The system of claim 1, wherein the carbonaceous materials comprise at least one of amorphous carbon black, graphitic carbon, graphene, carbon nanotubes, and iron carbide.

11. The system of claim 1, wherein the materials sorter and metal detector are part of a multi-stage metals-removal subsystem comprising:

- a primary shredder configured to reduce feedstock to particles of about 50-100 mm and liberate embedded metals;
- an overband magnet and a magnetic head pulley for bulk ferrous removal;
- an eddy-current separator for removal of non-ferrous metals;
- an inductive all-metal sensor sorter with an air-jet array for removal of stainless steel and embedded metallic fragments; and
- a fines treatment stage comprising a rare-earth drum magnet and a gravity free-fall all-metal separator.

12. The system of claim 1, wherein the processor is configured to reject or divert a feedstock batch when a detected total metal content exceeds a predetermined threshold.

13. The system of claim 1, wherein a particle-size distribution of metal-oxide particles is selected based on microwave penetration depth at both cold-start and elevated operating temperatures, such that a Dmax is no greater than about 150 μm at 2.45 GHz to ensure uniform heating.

14. The system of claim 1, wherein penetration depth of metal-oxide particles at operating temperature is at least twice a mean particle diameter.

15. The system of claim 1, wherein the processor is configured to integrate real-time sensor data from the reactor stage, mixing stage, and gas take-off stage into a feedback control loop that adjusts at least one of microwave power, rotation speed, sweep-gas flow, or gas take-off rate.

16. The system of claim 1, wherein the processor is further configured to execute predictive maintenance algorithms trained on historical sensor data to schedule maintenance before component failure.

17. A system for microwave-assisted catalytic production of solid carbonaceous products including carbon nanotubes and few-layer graphene from plastic materials, comprising:

a materials sorter configured to sort and remove metals from a batch of plastic materials;

a metal detector configured to detect metals in the batch of plastic materials;

a mixer configured to receive the batch of plastic materials and to receive a corresponding batch of metal-oxide particles comprising at least one transition-metal oxide selected from the group consisting of $Fe_2O_3$, $Fe_3O_4$, NiO, CoO, $Co_3O_4$, and mixed ferrites, the metal-oxide particles having an average particle size between about 50 nm and about 150 μm, the particle size selected based on microwave penetration depth at both cold-start and elevated operating temperatures;

a rotary microwave oven in communication with a microwave generator and configured to receive microwaves to heat contents of the rotary microwave oven under an inert atmosphere, wherein the rotary microwave oven receives a mixture of the metal oxide particles and the plastic materials; and a processor executing a program of instructions stored on a non-transitory, computer-readable storage medium to control operation of the rotary microwave oven, wherein the microwaves heat the metal-oxide particles, wherein the heated metal-oxide particles transfer heat to the plastic materials to induce pyrolysis and vaporization, wherein the processor controls at least carbon activity, hydrogen partial pressure, pyrolysis vapor residence time, and catalyst surface morphology to promote carbon nanotube or few-layer graphene growth on catalyst surfaces, wherein recovered solid carbonaceous products comprise:

for carbon nanotube production, at least 10% by mass carbon nanotubes having an average outer diameter between about 5 nm and about 50 nm; and for few-layer graphene production, graphene sheets having fewer than 10 layers and a lateral dimension greater than 1 μm comprising at least 10% by mass of the solid carbonaceous products.

* * * * *